United States Patent
Abe

(10) Patent No.: US 7,450,653 B2
(45) Date of Patent: Nov. 11, 2008

(54) DIGITAL BROADCAST SIGNAL RECEIVING APPARATUS AND METHOD

(75) Inventor: Yoshinori Abe, Tokyo (JP)

(73) Assignee: Pioneer Corporation, Tokyo (JP)

( * ) Notice: Subject to any disclaimer, the term of this patent is extended or adjusted under 35 U.S.C. 154(b) by 598 days.

(21) Appl. No.: 11/056,298

(22) Filed: Feb. 14, 2005

(65) Prior Publication Data

US 2005/0180517 A1     Aug. 18, 2005

(30) Foreign Application Priority Data

Feb. 16, 2004    (JP)  ............................ P2004-037968

(51) Int. Cl.
*H04K 1/10* (2006.01)
(52) U.S. Cl. ........................ 375/260; 370/203; 370/210; 370/241; 370/252; 370/281; 370/295; 370/319; 370/320; 370/321; 370/328; 370/431; 370/464; 370/465
(58) Field of Classification Search .................. 375/260
See application file for complete search history.

(56) References Cited

U.S. PATENT DOCUMENTS

| | | | | |
|---|---|---|---|---|
| 5,301,266 A | * | 4/1994 | Kimura | ........................ 345/660 |
| 5,307,376 A | | 4/1994 | Castelain et al. | |
| 6,654,429 B1 | * | 11/2003 | Li | .............................. 375/316 |
| 7,209,433 B2 | * | 4/2007 | Scarpa | ........................ 370/206 |

| | | |
|---|---|---|
| 2003/0016645 A1 | 1/2003 | Siala et al. |

FOREIGN PATENT DOCUMENTS

| | | |
|---|---|---|
| JP | 11-163822 A | 6/1999 |
| JP | 11-239115 A | 8/1999 |
| JP | 2002-261729 A | 9/2002 |
| JP | 2003-101503 A | 4/2003 |

OTHER PUBLICATIONS

Li Ye, Pilot-symbol-aided channel estimation for OFDM in wireless systems, IEEE transactions on Vehicular Technology, vol. 49, No. 4, Jul. 2000.*

European Search Report dated Nov. 26, 2007 issued in European Patent Application No. 05 002 693.9.

(Continued)

*Primary Examiner*—Shuwang Liu
*Assistant Examiner*—Dhaval Patel
(74) *Attorney, Agent, or Firm*—Sughrue Mion, PLLC

(57) ABSTRACT

A signal receiving apparatus and method which is high in deduction accuracy of transfer characteristic and less in error rate during signal decoding. For each detection signal of a pilot carrier allotted in an OFDM symbol space, a transfer function thereof is calculated. The transfer function is subjected to two-dimensional Fourier transform as to impulse delay time and symbol frequency thereby generating a two-dimensional data space. A predetermined domain of the two-dimensional data space is extracted by a filter extracting domain. The data included in the extracted domain is subjected to two-dimensional inverse Fourier transform as to carrier frequency and symbol time, thereby generating a deduced transfer function.

15 Claims, 18 Drawing Sheets

OTHER PUBLICATIONS

Li, Y., "Pilot-Symbol-Aided Channel estimation for OFDM in Wireless Systems", 49th Vehicular Technology Conference, May 16, 1999, pp. 1131-1135, vol. 2, Piscataway, NJ.

Sanzi, F. et al., "An Adaptive Two-Dimensional Channel Estimator for Wireless OFDM with Application to Mobile DVB-T", IEEE Transactions on Broadcasting, IEEE Service Center, Jun. 2000, pp. 128-133, vol. 46, No. 2, Piscataway, NJ.

Fernández-Getino Garcia, M.J., et al., "Pilot patterns for channel estimation in OFDM", Electronics Letters, Jun. 8, 2000, pp. 1049-1050, vol. 36, No. 12, IEE Stevenage, Great Britain.

Harada, Y., et al., "An Implementation Of OFDM Receiver For Digital Terrestrial Television Broadcasting And Its Technologies", International Broadcasting Convention, Sep. 12-16, 1997, Conference Publication No. 447, pp. 337-342, London, United Kingdom.

Park, S-Y., et al., "Iterative Receiver with Joint Detection and Channel estimation for OFDM System with Multiple Receiver Antennas in Mobile Radio Channels", IEEE Global Telecommunications Conference, Globecom'01, Nov. 25, 2001, pp. 3085-3089, vol. 5 of 6, New York, New York.

* cited by examiner

FIG. 1

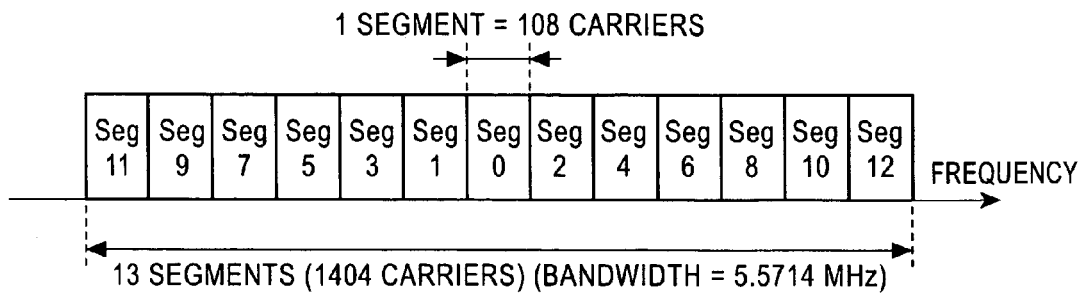

1 SEGMENT = 108 CARRIERS

| Seg 11 | Seg 9 | Seg 7 | Seg 5 | Seg 3 | Seg 1 | Seg 0 | Seg 2 | Seg 4 | Seg 6 | Seg 8 | Seg 10 | Seg 12 | FREQUENCY →

13 SEGMENTS (1404 CARRIERS) (BANDWIDTH = 5.5714 MHz)

FIG. 2

| PARAMETER NAME | ABBREV. | PARAMETER VALUE |
|---|---|---|
| SEGMENT BANDWIDTH | ws | 0.4286 MHz |
| IN-SEGMENT CARRIER COUNT | cs | 108 |
| CARRIER-TO-CARRIER BANDWIDTH | Fe | 3.968 kHz ( = ws/cs) |
| EFFECTIVE SYMBOL LENGTH | Te | 256 μsec ( = 1/Fe) |
| GUARD INTERVAL RATIO | Rg | 1/4, 1/8, 1/16 (OPTION) |
| GUARD INTERVAL LENGTH | Tg | Tg = Te × Rg |
| SYMBOL TRANSMISSION PERIOD | Ta | Ta = Te + Tg |
| SYMBOL TRANSMISSION FREQUENCY | Fa | Fa = 1/Ta |

FIG. 3

| PARAMETER NAME | ABBREV. | PARAMETER VALUE |
|---|---|---|
| TWO-DIMENSIONAL DOMAIN CARRIER WIDTH | nX | 128 |
| TWO-DIMENSIONAL DOMAIN SYMBOL WIDTH | nY | 256 |
| DEDUCED-DOMAIN CARRIER WIDTH | wX | 108 |
| DEDUCED-DOMAIN SYMBOL WIDTH | wY | 204 |

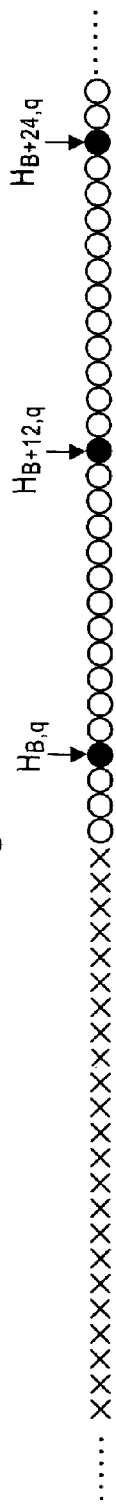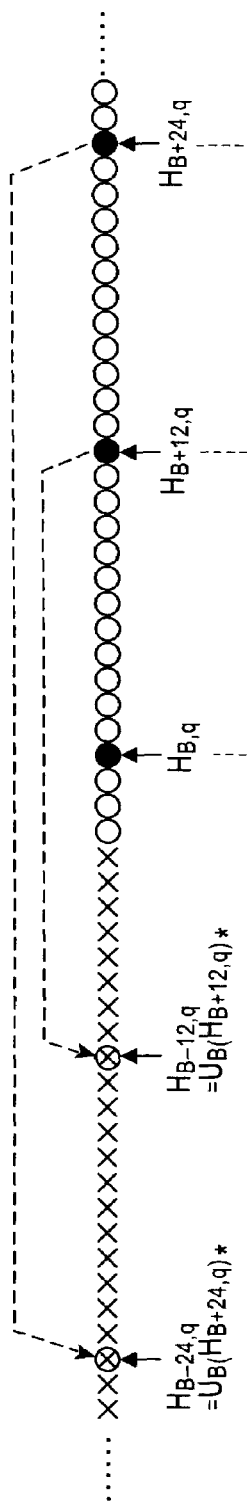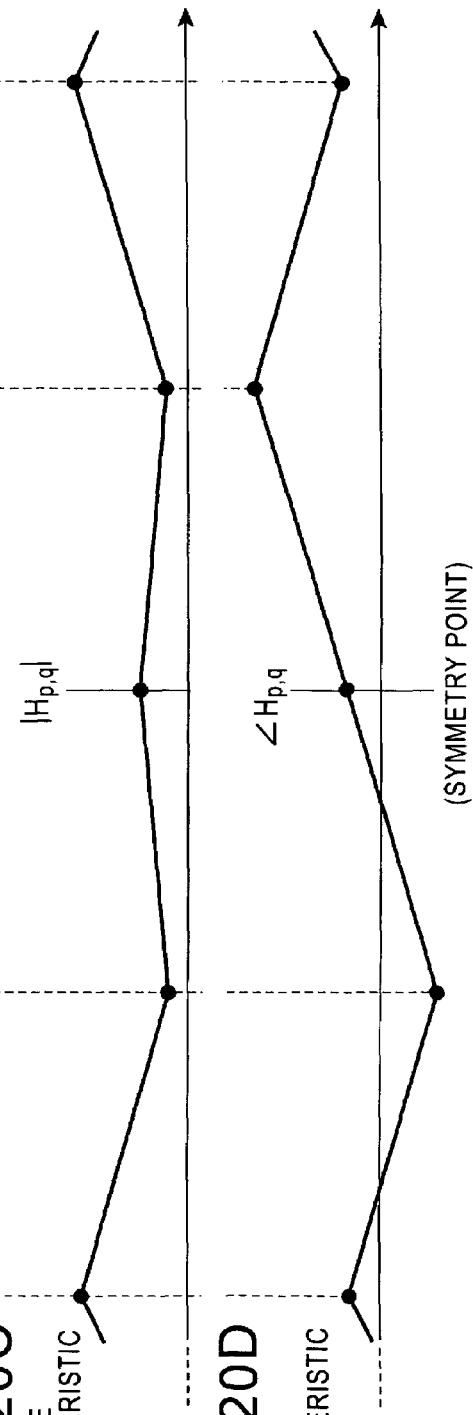
FIG. 20A
FIG. 20B
FIG. 20C
AMPLITUDE CHARACTERISTIC
FIG. 20D
PHASE CHARACTERISTIC

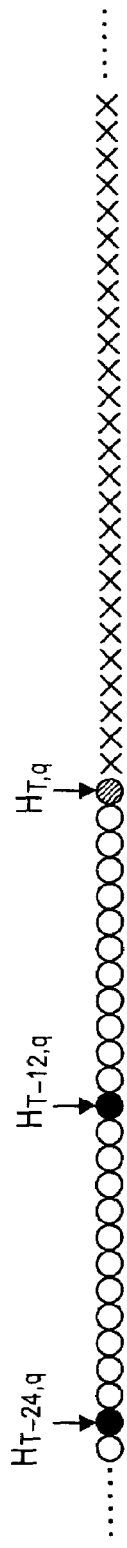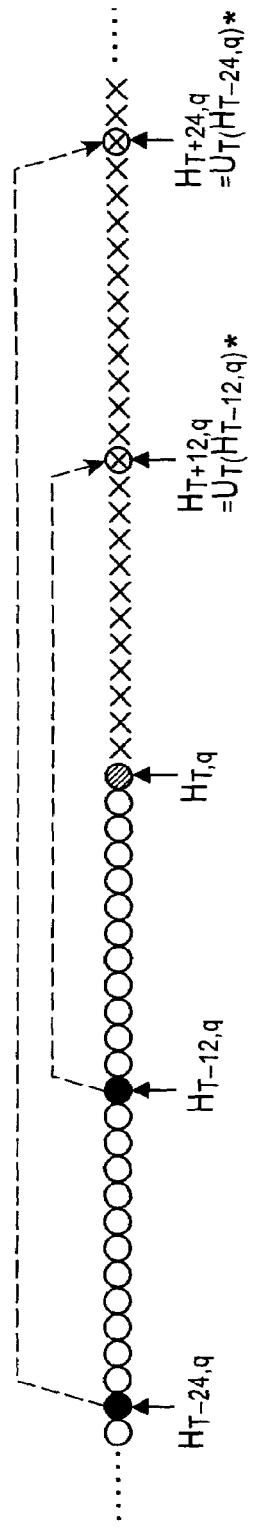

DIGITAL BROADCAST SIGNAL RECEIVING APPARATUS AND METHOD

BACKGROUND OF THE INVENTION

1. Technical Field

This invention relates to an apparatus and method for receiving terrestrial digital broadcast signals, for example.

2. Description of the Related Art

The OFDM (Orthogonal Frequency Division Multiplex) scheme is widely known as a modulation scheme for terrestrial digital broadcasts. This scheme is widely employed for terrestrial digital broadcast systems, e.g. European DVB-T (Digital Video Broadcasting-Terrestrial) standard and Japanese ISDB-T (Integrated Services Digital Broadcasting-Terrestrial) standard.

The OFDM scheme adopts so-called a multi-carrier scheme using a multiplicity of carriers allotted equally spaced on the frequency axis, i.e. modulation scheme for sequentially forwarding at an interval of unit transmission time (hereinafter, referred to as a "symbol transmission period") an OFDM symbol (hereinafter, referred to as a "symbol") obtained by modulating such carriers based on transmission data. The OFDM scheme has a feature resistive to multipath disturbance because of its capability of setting a symbol transmission period longer as compared to the single-carrier-based modulation scheme such as QAM and VSB.

Generally, in the terrestrial digital broadcast using OFDM scheme, a pilot carrier signal is used for facilitating to deduce an on-transmission-line transfer characteristic, together with a data carrier signal serving to convey video and audio information data. For example, in the above described standards such as of ISDB-T and DVB-T, a pilot carrier signal is defined and called scattered pilot carrier signal (hereinafter, referred to as "SP signal"). It is known that, when assuming an OFDM symbol SP signals are superimposed at particular positions within the same space, wherein its complex amplitude, i.e. absolute amplitude and phase, is previously defined. Accordingly, the receiver for receiving a digital broadcast of such standard is allowed to deduce a transfer characteristic relative to the carrier over the radio-wave propagation path by use of SP signals. On the basis of a result of deduction, correction and equalization processes are possible for the reception signal.

Incidentally, it is natural that the other carrier than SP signals, included in the OFDM symbol space, is of a data carrier signal modulated with QAM, PSK or the like.

In concerned with the signal-transfer characteristic estimating circuit and method for use in the conventional digital broadcast receiver, there are disclosures of the arts shown in Japanese Patent Kokai No. 11-163822 (Patent Document 1), Japanese Patent Kokai No. 11-239115 (Patent Document 2), Japanese Patent Kokai No. 2002-261729 (Patent Document 3), Japanese Patent Kokai No. 2003-101503 (Patent Document 4) and so on. These prior art are of a scheme that a two-dimensional filtering process is made on the transfer characteristic of SP carriers allotted disperse within the OFDM symbol space, thereby estimating the transfer characteristic of other data carriers. In any of those, two-dimensional filtering process is realized by a combination of a one-dimensional filter in a direction of symbol time (hereinafter, referred to as "symbol filter") and a one-dimensional filter in a direction of carrier frequency (hereinafter, referred to as "carrier filter").

Consequently, there is a difficulty in processing of adaptation optimization for the entire pass band of a two-dimensional filter, resulting in a problem of low estimation accuracy of signal transfer characteristic.

Meanwhile, in the conventional two-dimensional filtering process, the symbol filter uses an IIR (infinite impulse response) filter because of restriction in operation amount. However, the IIR filter does not have a phase linearity and hence cannot determine its absolute delay amount unambiguously. Thus, there is a problem of increased error in estimating a signal transfer characteristic on the OFDM symbol.

The problem the present invention is to solve includes, as one example, to provide a signal receiving apparatus and method which is high in estimation accuracy of transfer characteristic and less in error rate during signal decoding.

SUMMARY OF THE INVENTION

A signal receiving apparatus according to one aspect of the present invention comprises: a signal detecting section for receiving an OFDM signal including a pilot signal having a particular known complex amplitude at a predetermined carrier location, and allotting each reception complex amplitude obtained by detecting carriers included in a pluarlity of successive ones of ODFM symbols in a two-dimensional data domain on a two-dimensional space corresponding to carrier frequency and symbol time; a transfer characteristic estimating section for estimating a transfer characteristic relative to each of the carrier signals based on reception complex amplitudes corresponding to the pilot carriers among the reception complex amplitudes allotted in the two-dimensional data domain; and a data decode section for decoding the transmission data based on the reception complex amplitudes and the reception signal transfer characteristics; wherein the transfer characteristic estimating section includes: a calculator for calculating pilot carrier transfer characteristics based on reception complex amplitudes corresponding to the pilot carriers among the reception complex amplitudes allotted in the two-dimensional data domain; a transformer for making a two-dimensional Fourier transform on the pilot carrier transfer characteristics and generating two-dimensional Fourier transformed data on a two-dimensional space corresponding to on-transmission-line delay time and on-transmission-line variation frequency; a filter for selectively extracting a data group of within a particular domain defined by a filter extraction domain from the two-dimensional Fourier transformed data; and a generator for making a two-dimensional inverse Fourier transform on the selectively extracted data group and generating two-dimensional inverse transformed data on the two-dimensional space corresponding to carrier frequency and symbol time, and generating the reception signal transfer characteristic based on the generated data.

A signal receiving method according to another aspect of the present invention comprises: a step of receiving an OFDM signal including a pilot carrier having a particular known complex amplitude at a predetermined carrier location, and allotting each reception complex amplitude obtained by detecting carriers included in a plurality of successive ones of ODFM symbols in a two-dimensional data domain on a two-dimensional space corresponding to carrier frequency and symbol time; a step of estimating a reception signal transfer characteristic relative to each of the reception signals depending upon the pilot signal allotted in the two-dimensional data domain; and a step of decoding the transmission data based on the reception complex amplitudes and the reception signal transfer characteristics; wherein the transfer characteristic estimating step includes: calculating pilot carrier transfer characteristics based on reception complex amplitudes corresponding to the pilot carriers among the reception complex amplitudes allotted in the two-dimensional data domain; making a two-dimensional Fourier transform on the pilot carrier transfer characteristics and generating two-dimensional Fourier transformed data on a two-dimensional space corresponding to on-transmission-line delay time and on-transmission-line variation frequency; selectively extracting a data group of within a particular domain defined by a filter extraction domain from the two-dimensional Fourier transformed data; and making a two-dimensional inverse Fourier transform on the selectively extracted data group and generating two-dimensional inverse transformed data of on the two-dimensional space corresponding to carrier frequency and symbol time, and generating the reception signal transfer characteristic based on the generated data.

BRIEF DESCRIPTION OF THE DRAWINGS

FIG. 1 is an explanatory figure showing an OFDM symbol structure according to the ISDB-T standard;

FIG. 2 is an explanatory figure showing values of modulation parameters in transmission mode 1 according to the ISDB-T standard;

FIG. 3 is an explanatory figure showing values of constant parameters to be used in embodiments of the present invention;

FIGS. 20A-20D are explanatory figures showing a first deduction procedure of an SP-signal transfer characteristic according to a sixth embodiment;

FIGS. 21A and 21B are explanatory figures showing a second deduction procedure of an SP-signal transfer characteristic according to the sixth embodiment.

DETAILED DESCRIPTION OF THE INVENTION

Explanation will be made below on a receiver in a first embodiment based on the present invention.

Incidentally, in each of the ensuing embodiments, explanations will be by exemplifying a partial receiver for a terrestrial digital broadcast based on ISDB-T. In the case of the ISDB-T standard, the OFDM symbol is constituted with 13 segments, as shown in FIG. 1. Each segment, in transmission mode 1, contains 108 waves of carriers, for example. The partial receiver refers to a receiver for demodulating only the carriers included in segment 0 positioned centrally of the 13 segments.

In the below cases, explanations will be by exemplifying the case in transmission mode 1 of a plurality of transmission modes as defined under the ISDB-T standard. Incidentally, FIG. 2 is shown the values of modulation parameters in transmission mode 1 while in FIG. 3 is shown the values of constant parameters to be used in the explanations.

Figure 4:
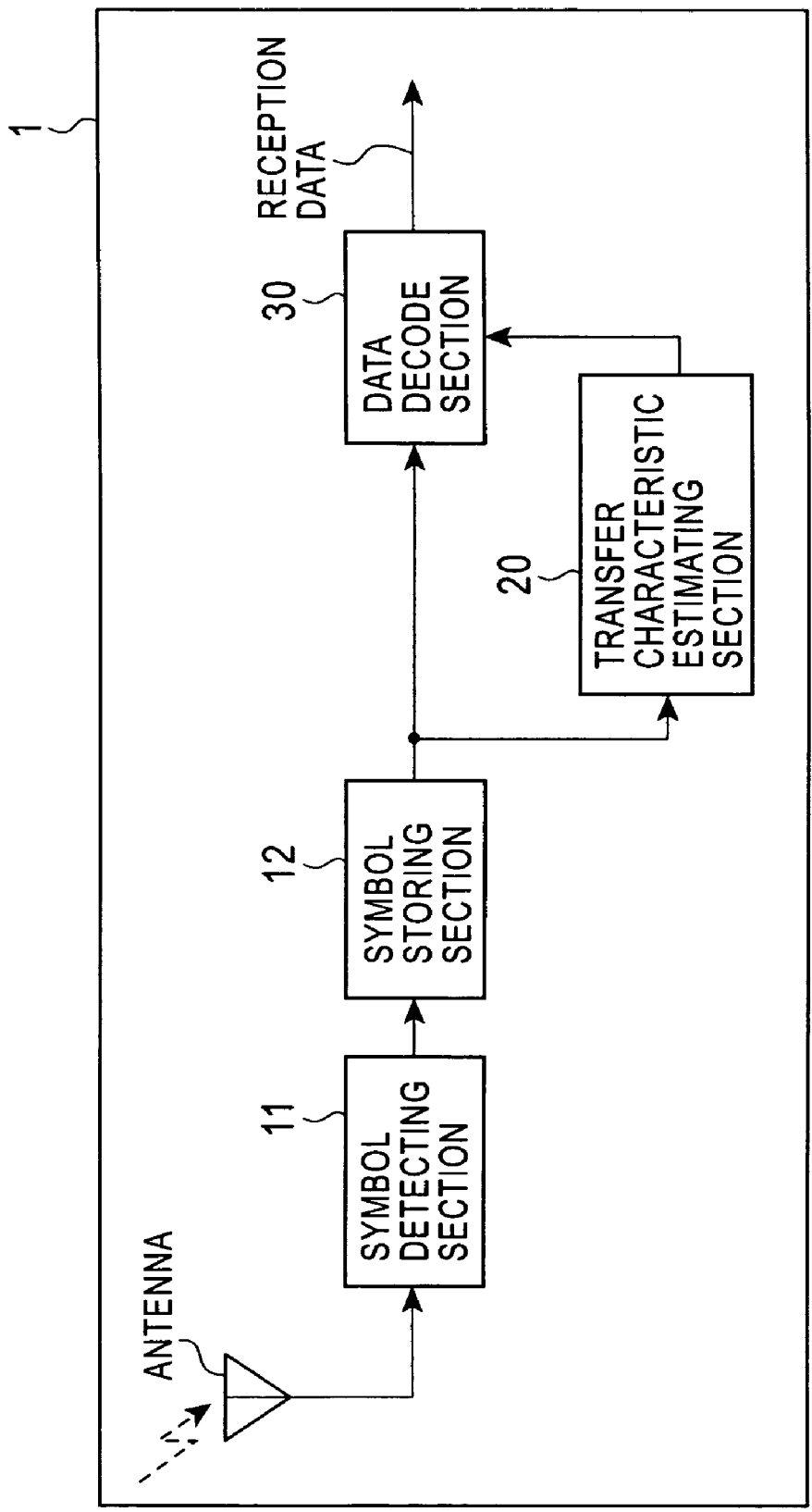
FIG. 4 is a block diagram showing a configuration of a receiver according to a first embodiment.

First of all, there is shown in FIG. 4 a configuration of a receiver 1 based on a first embodiment. As shown in the figure, the receiver 1 is configured mainly by a symbol detecting section 11, a symbol storing section 12, a transfer-characteristic estimating section 20 and a data decoding section 30. Incidentally, the arrow representing a signal flow in the figure shows the major signal of flow at between the constituent elements. For example, the response and monitor signals associated with the major signal assumably include the case of transfer in the opposite direction to the arrow of the figure. Furthermore, the arrow in the figure is to conceptionally represent a signal flow between the constituent elements. Hence, in the actual apparatus, each signal must not be faithfully transmitted/received as per the route shown by the arrow. Meanwhile, in the actual apparatus, the constituent elements must not be divided faithfully as shown in the figure.

Figure 5:
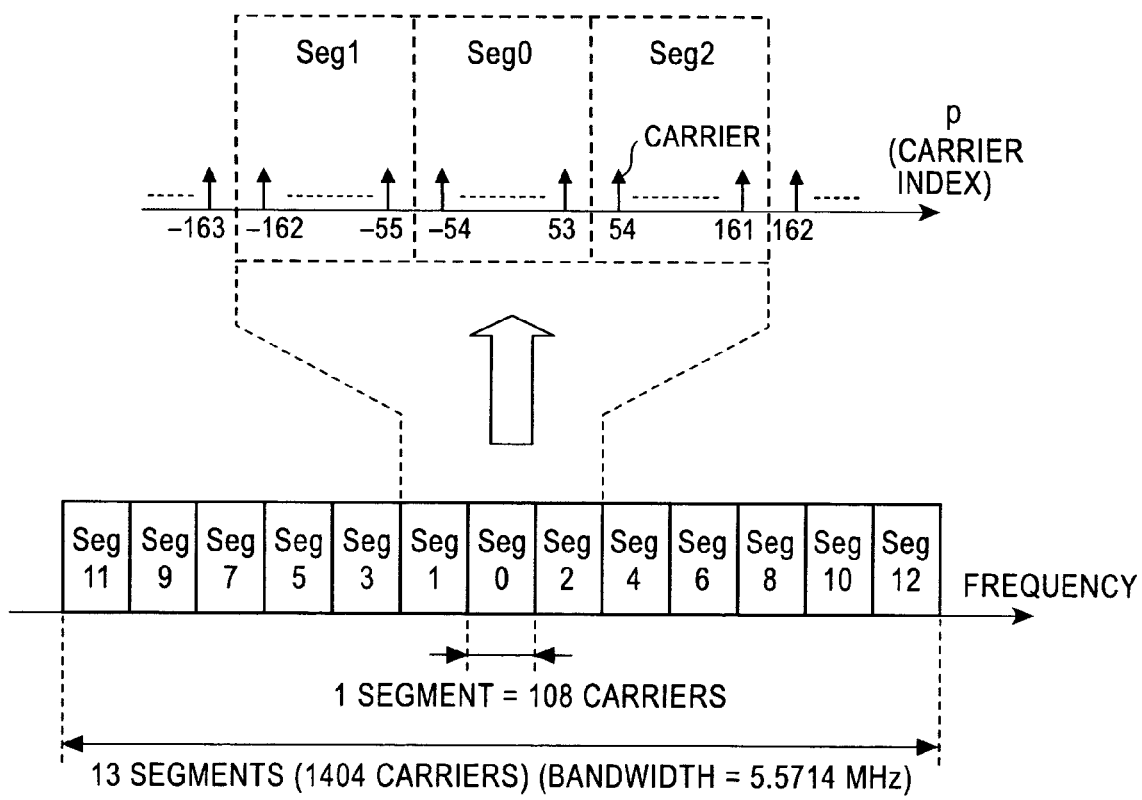
FIG. 5 is an explanatory figure showing a relationship between the segment and carrier index.

The symbol detecting section 11 detects carriers contained in each of the symbols sequentially transmitted, and determines a complex amplitude $S_{p,k}$ of the carrier (hereinafter, referred to as "carrier amplitude"). Here, $S_{p,k}$ represents a p-th carrier amplitude in a k-th symbol. The carrier index p is assumably allotted such that the central carrier of the channel corresponds to index p=0, as shown in FIG. 5. Namely, the central carrier of the channel corresponds to $S_{0,k}$ while the carrier group in segment 0 to $S_{-54,k}$-$S_{53,k}$, respectively. The symbol detecting section 11 is configured by the constituent circuits of a tuner, an A/D converter, a guard-interval removing circuit, an FET circuit and so on. However, the configuration is not limited to that example.

Next, the symbol storing section 12 is a circuit which selects those central of the channel in the number of nX out of the carrier amplitudes outputted from the symbol detecting section 11 and stores those for a time of nY symbols in a direction of symbol time. Namely, concerning the carrier groups (in the number of nX×nY) within an OFDM symbol space shown in FIG. 6, carrier amplitudes $S_{p,q}$ (-nX/2≦p<nX/2, k-nY<q≦k) are stored. In the below, explanation is on the assumption that the stored carrier amplitudes are in a two-dimensional matrix $\{S_{p,q}: (p, q) \in Z_{2D}\}$ on a space (p, q).

Figure 6:
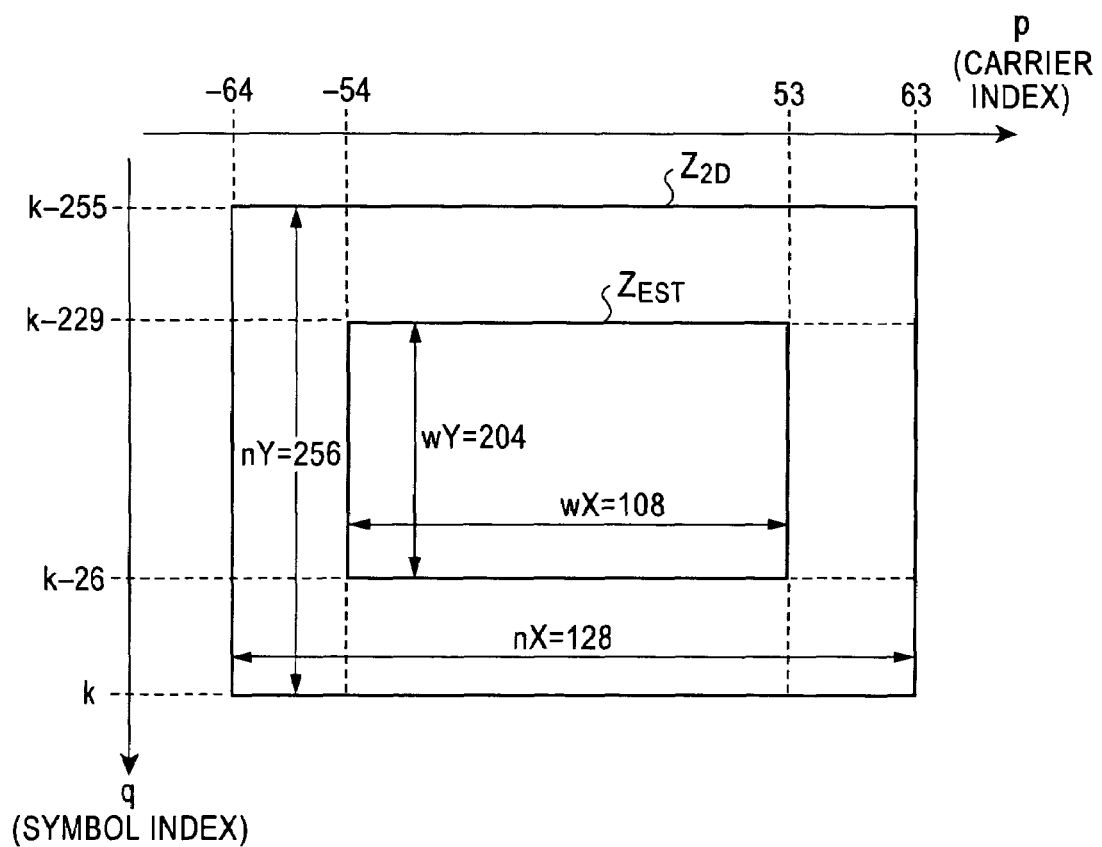
FIG. 6 is an explanatory figure showing a structure of an OFDM symbol space.

Incidentally, as shown in FIG. 6, p is a carrier index and q is a symbol index wherein the respective indexes correspond to carrier frequency and symbol time. Meanwhile, $Z_{2D}$ corresponds a two-dimensional fast Fourier transform domain (hereinafter, referred to as "2D-FFT domain") in the figure. The domain has a range defined, in the direction of carrier frequency, as $$-nX/2 \leq p < nX/2$$

and, in the direction of symbol time, as $$k-nY < q \leq k.$$

Figure 7:
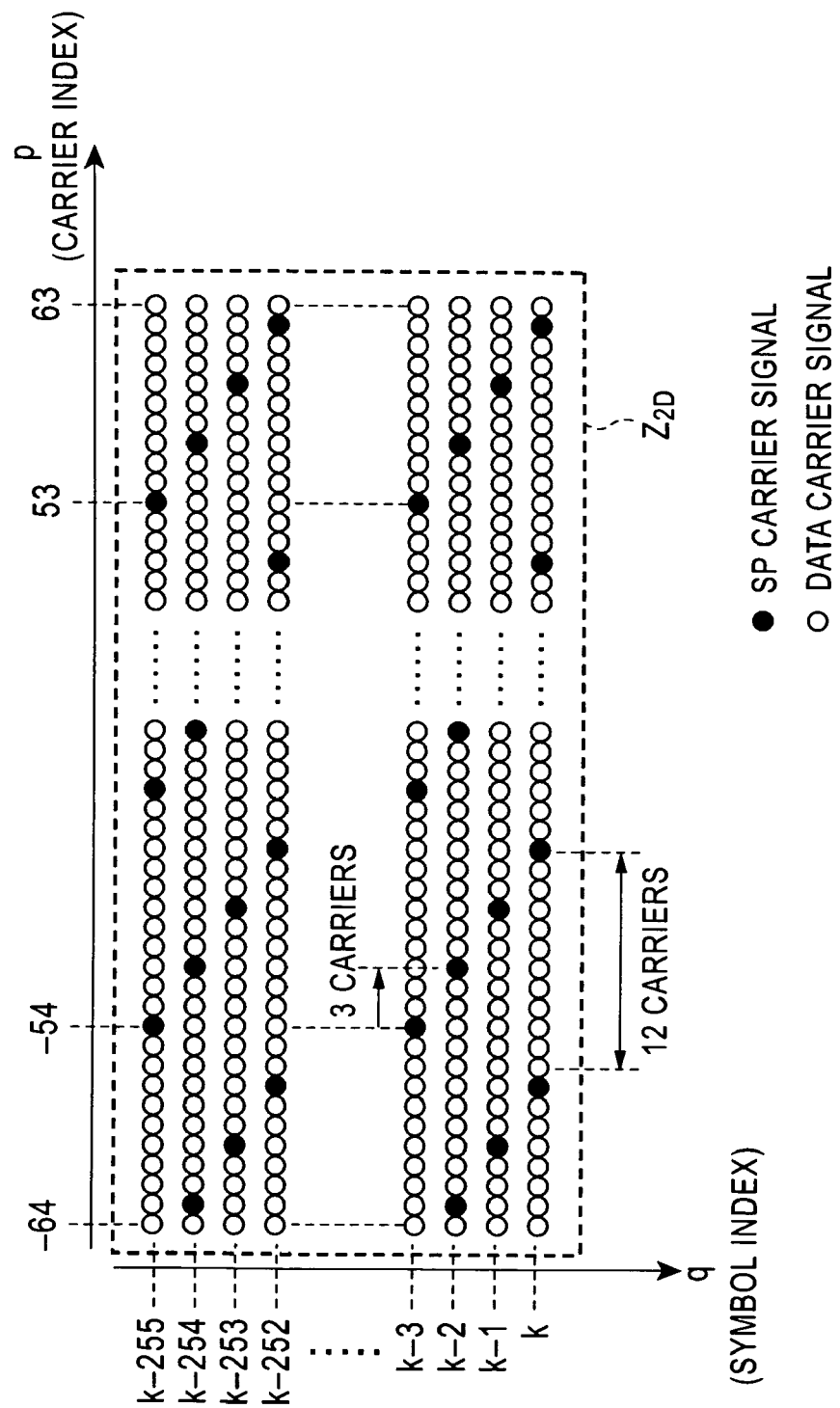
FIG. 7 is an explanatory figure showing the attribute of a carrier allotted in the OFDM symbol space.

Incidentally, in FIG. 7 is shown a relationship between each piece of carrier amplitude information arranged two-dimensionally on the space (p, q) as an OFDM symbol space and an attribute of each carrier (attribute that the relevant carrier is an SP signal or a data carrier signal). As apparent from the figure, SP signals are superimposed at a rate of one out of 12 carriers wherein the superimposing position shifts cyclically by 3 carriers per symbol.

Meanwhile, the data decode section 30 is a section which extracts carrier amplitudes $\{S_{p,q}: (p, q) \in Z_{EST}\}$ of within an estimating domain $Z_{EST}$ ($-wX/2 \leq p < wX/2$, $k-nY/2-wY/2 \leq q \leq k-nY/2+wY/2$) shown in FIG. 6 from the carrier amplitude data groups stored in the symbol storing section 12 thereby making a decode processing thereon.

Meanwhile, the transfer-characteristic estimating section 20 is a section which calculates a deduced transfer characteristic on the charier amplitude of within the estimating domain $Z_{EST}$ depending upon the carrier amplitude stored in the symbol storing section 12 and supplies it to the data decode section 30.

The data decode section 30 makes such processing as equalization, de-interleave and Reed-Solomon decode depending upon a carrier amplitude of from the symbol storing section 12 and an deduced transfer characteristic of from the transfer-characteristic estimating section 20, and outputs the reception data obtained as a result thereof. Incidentally, because the transfer-characteristic estimating section 20 makes a deduction of transfer characteristic over the symbol sections successive in the number of wY, it may operate at a rate once per receiving wY symbols without the need to operate in timing of every reception of a symbol. Such operation timing is true for the operation timing in the data decode section 30.

Now explanation is made on the configuration and operation of the transfer-characteristic estimating section 20.

Figure 8:
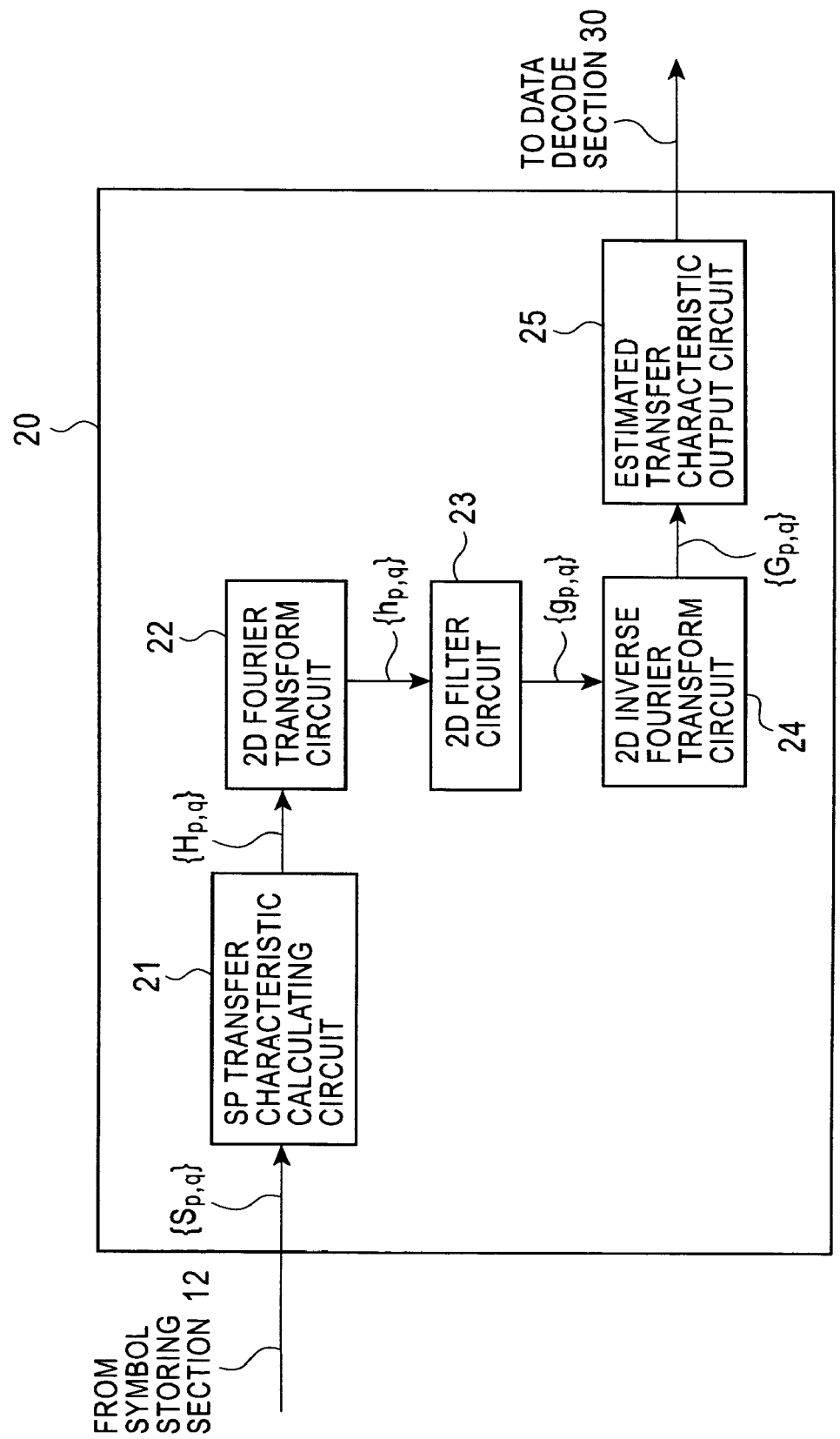
FIG. 8 is a block diagram showing a configuration of a transfer characteristic estimating section 20 in the receiver of FIG. 4.

First, in FIG. 8 is shown a configuration of the transfer-characteristic estimating section 20. As shown in the figure, the transfer-characteristic estimating section 20 is configured mainly with an SP-signal transfer characteristic calculating circuit 21, a two-dimensional Fourier transform circuit 22, a two-dimensional filter circuit 23, a two-dimensional inverse Fourier transform circuit 24 and an deduced-transfer-characteristic output circuit 25. Note that, in the below explanation, these circuits are respectively referred to as a calculating circuit 21, a transform circuit 22, a filter circuit 23, an inverse transform circuit 24 and an output circuit 25.

Subsequently, explanation is made on the operation of the transfer-characteristic estimating section 20. As noted before, the terrestrial digital broadcast under the ISDB-T standard is previously defined with an existence point of SP signals in a carrier arrangement on the OFDM symbol space and a complex amplitude value of SP signals during transmission. Accordingly, the calculation circuit 21 extracts only a carrier amplitude concerning the SP signal from the carrier amplitudes supplied from the symbol storing section 12 and divides it by a known value of transmission complex amplitude. This can determine a transfer characteristic $\{H_{p,q}: (p, q) \in Z_{2D}\}$ in concerned with the SP signals spotted on the space (p, q). In this connection, calculation procedure is as follows.

At first, when $S_{p,q}$ corresponds to the SP signal on all the elements (p, q) within the domain $Z_{2D}$ shown in FIG. 7, the calculating circuit 21 takes $$H_{p,q} = S_{p,q}/R_{p,q}$$

and determines a transfer characteristic $H_{p,q}$ concerning the relevant SP signal. Here, $R_{p,q}$ is a sending complex amplitude value of the known SP signal.

Also, the calculating circuit 21 takes $$H_{p,q} = 0$$

for the other data carrier signals than the SP signal and fixes the transfer function thereof.

The calculating circuit 21, after determining transfer characteristics $H_{p,q}$ on all the elements (p, q) within the domain $Z_{2D}$, outputs a result thereof to the transform section 22.

The transform section 22 carries out a two-dimensional Fourier transform on the SP-signal transfer characteristic $\{H_{p,q}\}$ on the space (p, q) into an SP-signal transfer characteristic $\{h_{m,n}: (m, n) \in Z_{TRA}\}$ on the space (m, n). Namely, in a carrier frequency direction (p direction) of the space (p, q), the frequency domain is transformed into a time domain by carrying out an IFFT (inverse fast Fourier transform). In a direction of symbol time (q direction), the time domain is transformed into a frequency domain by carrying out a FFT (fast Fourier transform).

As a result, in the space (m, n) of after the two-dimensional Fourier transform, the direction of m-axis corresponds to time dimension and the direction of n-axis to frequency dimension, respectively. Meanwhile, the domain $Z_{2D}$ on the space (p, q) corresponds to the domain $Z_{TRA}$ transformed onto the space (m, n). This domain is defined in the m-axis direction as $$-nX/2 \leq m < nX/2$$

and in the n-axis direction as $$-nY/2 \leq n < nY/2.$$

The filter circuit 23 is a circuit for making a predetermined filtering processing on the data group Fourier-transformed onto the space (m, n) by the transform circuit 22. As referred later, on-transmission-line transfer characteristic has a power spectrum distribution that tends to concentrate onto a particular domain of the space (m, n), depending upon a nature of transmission line. Accordingly, the filter circuit 23 multiplies a real coefficient of two-dimensional filter window $\{W_{m,n}\}$ having a pass band covering that domain on the SP-signal transfer characteristic $\{h_{m,n}\}$ of the space (m, n), thereby calculating an deduced transfer characteristic $\{g_{m,n}\}$ on the space (m, n). Note that, naturally, various forms of window functions, such as a rectangular window and a cosine rolloff window, are applicable for the two-dimensional filter window. The deduced transfer characteristic $\{g_{m,n}\}$ calculated by the filter circuit 23 is outputted to the next-staged inverse transform circuit 24.

The inverse transform circuit 24 carries out a two-dimensional inverse Fourier transform, as an inverse process to two-dimensional Fourier transform, on the deduced transfer characteristic $\{g_{m,n}\}$ supplied from the filter circuit 23 to thereby calculate an deduced transfer characteristic $\{G_{p,q}: (p, q) \in Z_{2D}\}$ of the space (p, q).

The deduced transfer characteristic $\{G_{p,q}\}$ calculated by the inverse transform circuit 24 is supplied to the output circuit 25. The same circuit extracts the deduced transfer characteristic $\{G_{p,q}: (p, q) \in Z_{EST}\}$ corresponding to the carrier amplitude of deduced domain $Z_{EST}$ extracted by the data decode section 30 and supplies the extracted data to the data decode section 30.

Incidentally, the reason why not to output an deduced transfer characteristic concerning the $Z_{2D}$ entire domain from the transfer-characteristic estimating section 20 to the data decode section 30 is because, in a periphery of the space (p, q), errors are to occur in the deduced transfer characteristic under the influence of a domain end. In order to relieve such influence at the end, nX and nY may use, as concrete values, further greater values than the values of this embodiment. Although this embodiment uses a value wY=204 as an deduced domain symbol width wY, the deduced domain symbol width wY is not limited to such values. Similarly, although this embodiment used, as an deduced domain carrier width wX, a value wX=108 corresponding to the number of carriers contained in the same segment from consideration of a configuration of one-segment partial receiver, this also is not limited to such values. For example, for a receiver for receiving and demodulating three segments allotted centrally of a transmission band, it is satisfactory to provide wX=324.

As explained in the above, a signal receiver according to the present embodiment includes: a signal detecting section 11 for receiving an OFDM signal superimposed with a pilot signal having a particular known complex amplitude over a predetermined carrier of within a transmission symbol on a transmission unit basis of a transmission symbol generated by orthogonally modulating a plurality of carriers on a basis of transmission data, and allotting a reception signal obtained by detecting a carrier group included in a plurality of successive ones of the transmission symbols in a two-dimensional data domain on a two-dimensional space corresponding to carrier frequency and symbol time; a transfer characteristic estimating section 20 for estimating a reception signal transfer characteristic relative to each of the reception signals depending upon the pilot signal allotted in the two-dimensional data domain; and a data decode section 30 for decoding the transmission data depending upon the reception signal and the reception signal transfer characteristic; wherein the transfer characteristic estimating section 20 includes: a calculator circuit 21 for calculating a pilot signal transfer characteristic for the pilot signal allotted in the two-dimensional data domain; a transformer circuit 22 for making a two-dimensional Fourier transform on the pilot signal transfer characteristic and generating two-dimensional Fourier transformed data of on the two-dimensional space corresponding to on-transmission-line delay time and on-transmission-line variation frequency; a filter circuit 23 for selectively extracting a data group of within a particular domain defined by a filter extracted domain of the two-dimensional Fourier transformed data; and an inverse transformer circuit 24 and output circuit 25 for making a two-dimensional inverse Fourier transform on the selectively extracted data group and generating two-dimensional inverse transformed data of on the two-dimensional space corresponding to carrier frequency and symbol time, and generating the reception signal transfer characteristic depending upon the generated data.

Therefore, according to the receiver of this embodiment, the two-dimensional filtering process conventionally realized by convolution integration in a space (p, q) is to be realized by multiplication of a window in space (m, n) of after two-dimensional Fourier transform. In this configuration, there is no occurrence of delay due to filtering as long as the two-dimensional filter window coefficient $W_{m,n}$ is a real number. Accordingly, it is possible to correctly calculate a deduced transfer characteristic for a particular carrier amplitude.

Now explanation is made on a second embodiment based on the invention.

In the meanwhile, on the space (m, n) that a space (p, q) has been two-dimensional-Fourier-transformed, the m-axis corresponds to time and the n-axis to frequency respectively, as mentioned before. If expressing it more correctly, the m-axis corresponds to a delay time of impulse response over the transmission line while the n-axis corresponds to a variation frequency (Doppler frequency) over the transmission line. Therefore, the power spectrum of on-transmission-line transfer characteristic appearing on the space (m, n) exhibits a tendency to concentrate to a particular domain on the space (m, n) in accordance with a reception environment, as mentioned before.

Figure 9:
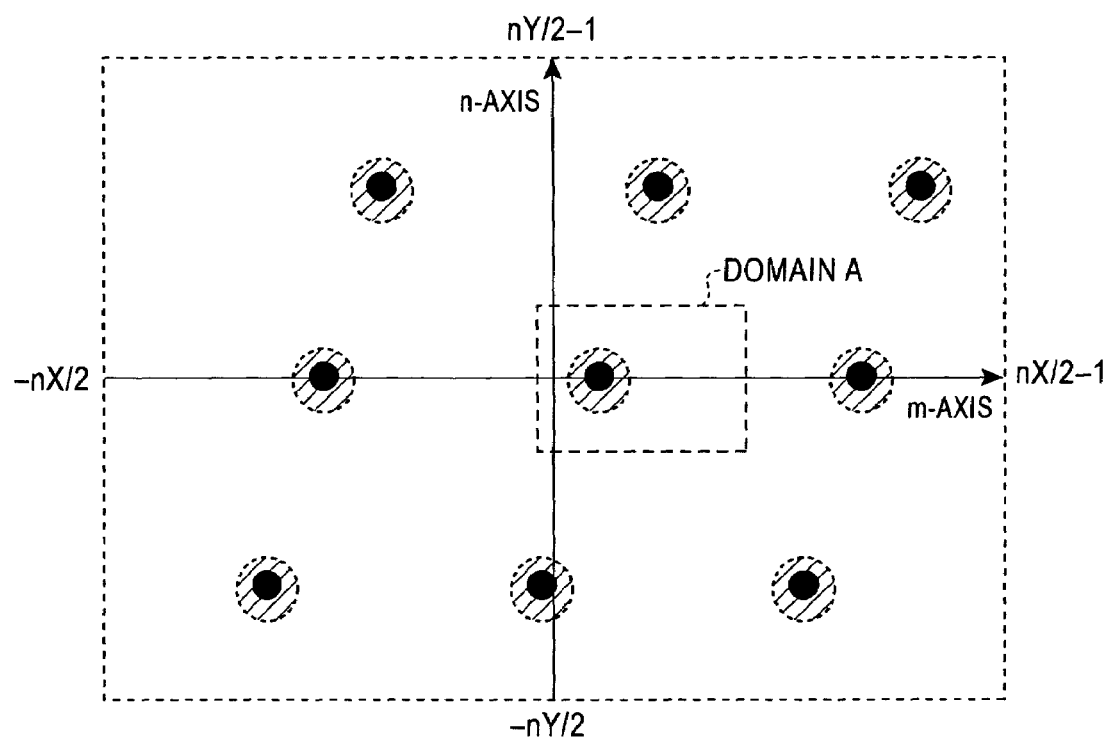
FIG. 9 is an explanatory figure showing a power spectrum distribution on a space (m, n) in reception environment 1.

For example, in the case of stationary reception in an suburban area where no edifices such as high-rise buildings and the like exist around the receiver (reception environment 1), there is less delay spread in a reception radio wave due to multi-path wherein dispersion is less in the m-axis direction. Also, because the receiver is fixed, there is less variation in transmission line characteristic and hence dispersion is less in the n-axis direction. FIG. 9 shows a power spectrum distribution $|h_{m,n}|^2$ of SP-signal transfer characteristic on the space (m, n) under such an environment. In the same figure, power spectrum distribution density is expressed by simulation in the hatched domains at black dots and therearound. In this case, as apparent from the same figure, the power spectrum distribution of transmission line transfer characteristic is to concentrate in a domain A nearby the origin on the space (m, n). The first requirement for the two-dimensional filter window explained in the first embodiment, is to pass such a power spectrum of on-transmission-line transfer characteristic.

On the other hand, a plurality of power spectrum distributions spotted outside the domain A in FIG. 9 are aliasing components of a power spectrum of on-transmission-line transfer characteristic in nature. Namely, the SP-signal transfer characteristic calculating circuit 21 calculates only an SP-signal transfer characteristic of among the signal transfer characteristic to be defined in nature over the entire domain of the space (p, q). For the other domain than this, $H_{p,q}=0$ is given to approximate the transfer characteristic by zero interpolation. Namely, the SP-signal transfer characteristic $\{H_{p,q}\}$ as an output of the calculating circuit 21 is a sub-sampled one of reception signal transfer characteristics at a superimposition point of the SP signal with a result that an aliasing component occurs on the space (M, n). The second requirement for the two-dimensional filter window lies to remove these aliasing components.

Furthermore, the third requirement for the two-dimensional filter window includes a function to suppress the noise component contained in the reception signal. In this connection, in order to enhance the noise suppressing function, it is satisfactory to narrow the pass band through the two-dimensional filter window as can be understood intuitively, i.e. to reduce the area of the domain A shown in FIG. 9.

Namely, in view of the requirements for the two-dimensional filter window, the two-dimensional filter window desirably is provided in a suitable position on the space (m, n) and has a required minimum size to pass only the power spectrum of on-transmission-line transfer characteristic. Accordingly, provided that the receiver is used only in the environment of reception environment 1 shown in FIG. 9, the two-dimensional filter window is satisfactorily set with a pass band only in a quite narrow domain nearby the origin of the space (m, n).

Figure 10:
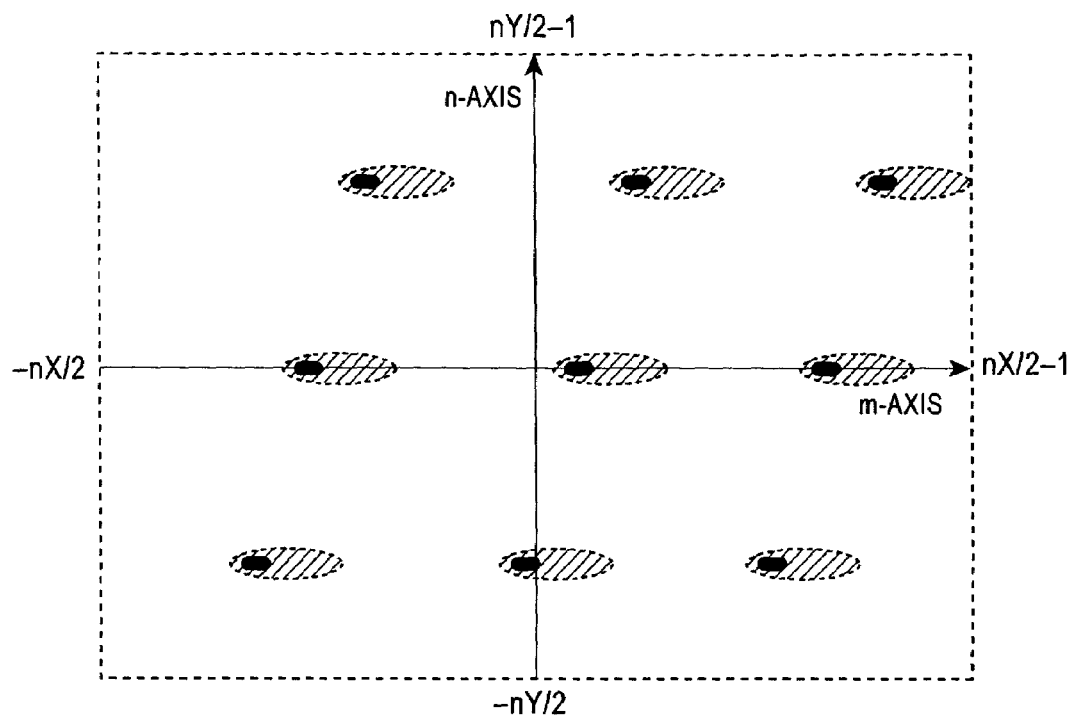
FIG. 10 is an explanatory figure showing a power spectrum distribution on a space (m, n) in reception environment 2.
Figure 11:
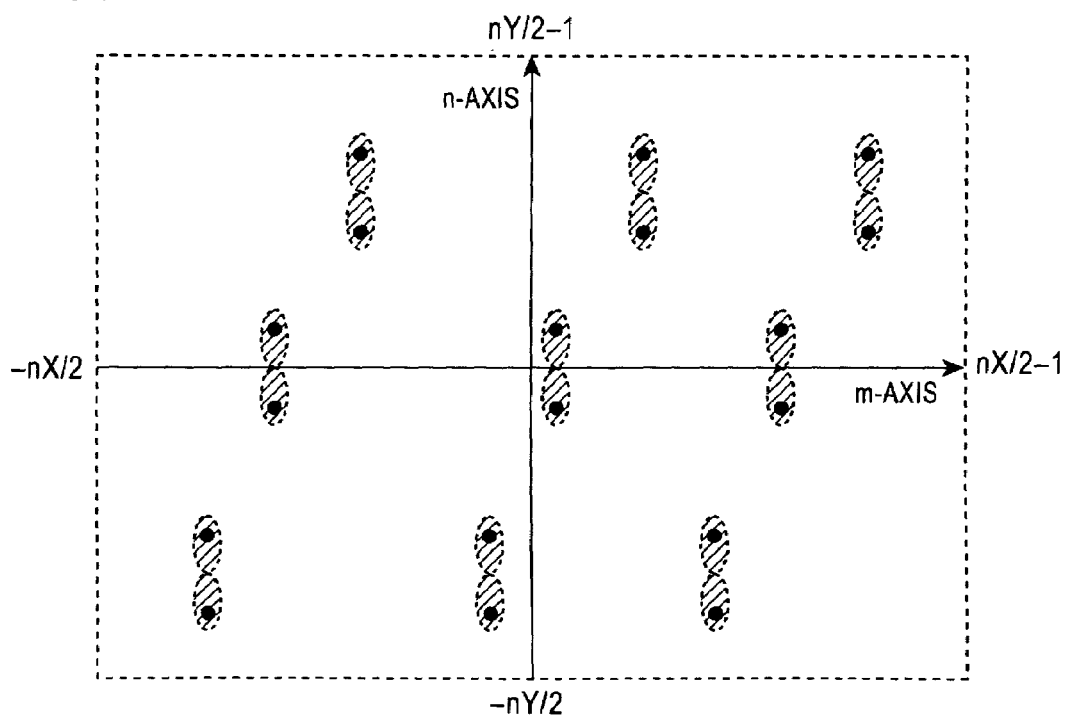
FIG. 11 is an explanatory figure showing a power spectrum distribution on a space (m, n) in reception environment 3.

However, the power spectrum distribution of on-transmission-line transfer characteristic on the space (m, n) greatly changes depending upon reception environment. For example, in the urban area crowded with edifices such as high-rise buildings, there is an increase of multipath delay due to reflection wave whose power spectrum distribution is given a distribution spread in the m-axis direction, as shown in FIG. 10. Meanwhile, in the reception environment where the receiver is mounted and used on a mobile body as a vehicle, there is an increase of in-time variation of on-transmission-line characteristic whose power spectrum distribution is given a distribution spread in the n-axis direction, as shown in FIG. 11.

Figure 12:
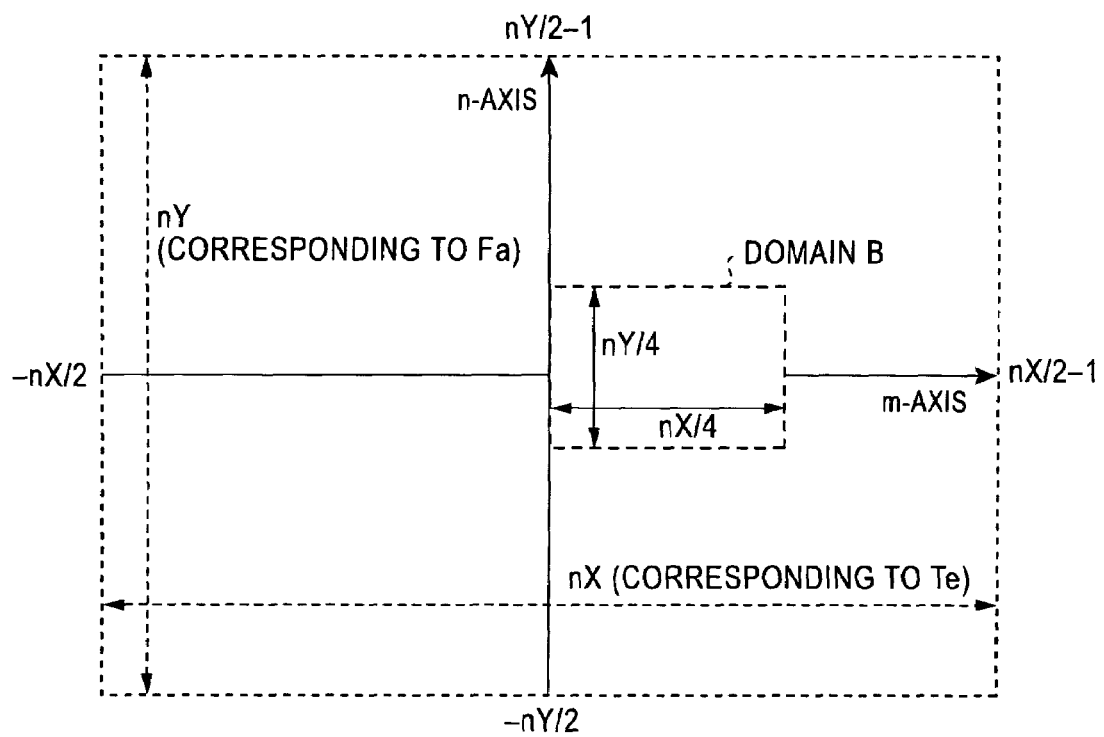
FIG. 12 is an explanatory figure showing a setting example of a two-dimensional filter window on the space (m, n)

Because of the need to cope with such various reception environments, the actual receiver is necessarily set previously with a broad pass band on the two-dimensional filter window. For example, in the case a pass band of two-dimensional filter window is set in a domain B shown in FIG. 12, it can cope with a transmission line having a power spectrum distribution of from 0 to Te/4 (Te: effective symbol period) on multipath delay time and from −Fa/8 to Fa/8 (Fa: symbol transmission frequency) on Doppler frequency.

However, in case such a two-dimensional filter window be set in an ideal reception environment shown in FIG. 9, an increased amount of noise component is passed through a pass band broader than the required. This results in a fear that the deduced transfer characteristic lowers in accuracy under the influence of the noise component.

The embodiment shown below is to solve such a problem. Incidentally, the receiver 1 of this embodiment is similar in configuration to the block diagram of the first embodiment shown in FIG. 4 except for the internal configuration of its transfer-characteristic estimating section 20a.

Figure 13:
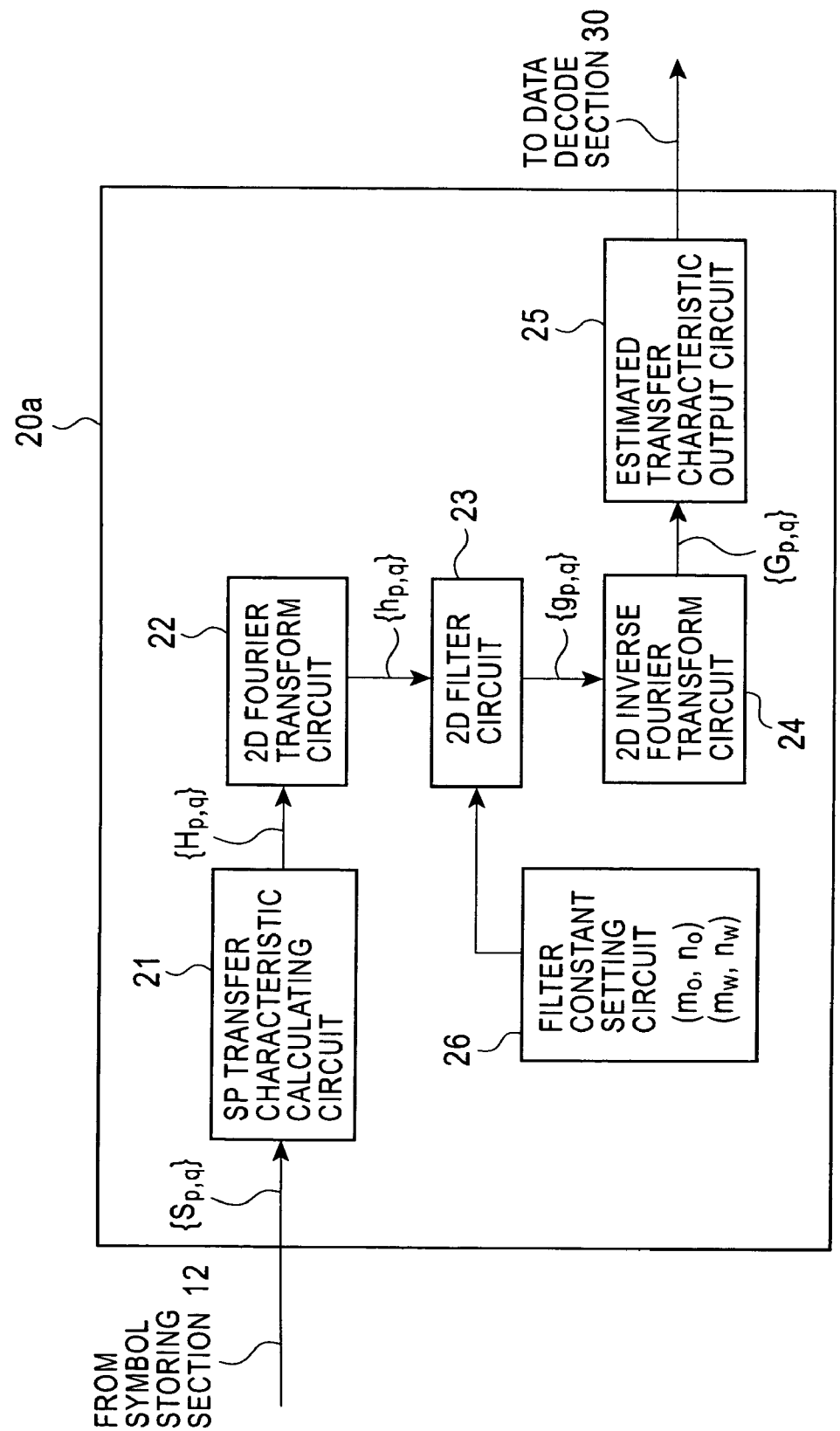
FIG. 13 is a block diagram showing a configuration of a transfer characteristic estimating section 20a in a second embodiment.

In FIG. 13 is shown a configuration of a transfer-characteristic estimating section 20a of this embodiment. As shown in the figure, the transfer-characteristic estimating section 20a is configured mainly with an SP-signal transfer characteristic calculating circuit 21, a two-dimensional Fourier transfer circuit 22, a two-dimensional filter circuit 23, a two-dimensional inverse Fourier transfer circuit 24, an deduced transfer characteristic output circuit 25 and a filter-constant setting circuit 26 (hereinafter, referred to as a "setting circuit 26"). Incidentally, of these constituent elements, the calculating circuit 21 and the output circuit 25 are similar to the first embodiment and hence omitted of their explanations, thus using the similar abbreviations to the first embodiment.

Figure 14:
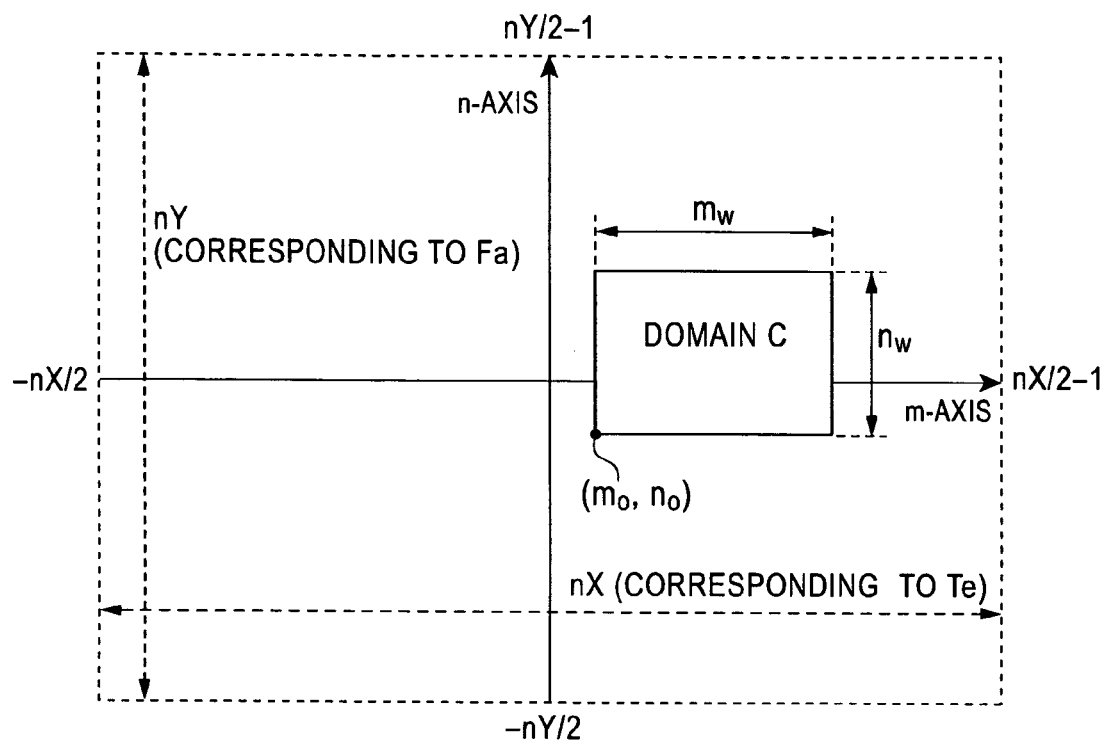
FIG. 14 is an explanatory figure showing a setting example of a two-dimensional filter window in the second embodiment.

This embodiment is characterized in that the filter circuit 23 has a pass band of two-dimensional filter window to be determined by the parameters of window frame pointer ($m_0$, $n_0$) and window width ($m_w$, $n_w$) notified from the setting circuit 26. Namely, the pass band C of two-dimensional filter window of this embodiment is set with widths $m_w$ and $n_w$ respectively in m-axis and n-axis directions with reference to a window frame pointer ($m_0$, $n_0$) as a basis point, as shown in FIG. 14.

This sets the filter circuit 23 with an output as $$g_{m,n} = h_{m,n}$$

in a rectangular domain C ($m_0 \leq m < m_0 + m_w$: $n_0 - n_w/2 \leq n < n_0 + n_w/2$) on the space (m, n) and $$g_{m,n} = 0$$

in the other domain.

Namely, only the SP-signal transfer characteristic component contained in the domain C of FIG. 14 is extracted, thus enabling to freely set a pass band of two-dimensional filter window suited for reception environment.

For example, in the spectrum-distribution reception environment shown in FIG. 10, it is satisfactory to set $m_w$ greater and $n_w$ smaller. Meanwhile, in the spectrum-distribution reception environment shown in FIG. 11, conversely it is satisfactory to set $m_w$ smaller and $n_w$ greater.

In setting a pass band of two-dimensional filter window in this embodiment, for example, the user using the receiver may adjust the parameters of the setting circuit 26 by manual operation depending upon a reception condition. Otherwise, the configuration may be provided such that the setting circuit 26 acquires information representative of reception condition such as reception electric field intensity and reception signal error rate so that a suitable pass band can be set corresponding to the information according to a predetermined ROM table or the like.

Incidentally, the setting parameters in this embodiment are not limited to the above case, e.g. designation may be made for three or more window frame pointer defining a pass band through the two-dimensional filter window. Otherwise, the configuration may be to set a desired pass band by use of a plurality of window frame pointers and a plurality of pieces of window frame information.

As explained above, this embodiment further includes, in addition to the configuration of the first embodiment, a setting circuit 26 for supplying the filter circuit 23 with a setting parameter defining a setting position of two-dimensional filter window on the basis of an input instruction. The filter circuit 23 is allowed to define a pass band thereof depending upon the setting parameter.

Accordingly, because the present embodiment can freely set a pass band of two-dimensional filter window corresponding to various reception environment, an deduced transfer characteristic can be accurately calculated without picking up unnecessary noise components through the pass band.

Incidentally, in the case that the similar function to the present embodiment is realized by the conventional convolution operation in the space (p, q), the receiver necessarily stores a set of many convolution coefficients in accordance with window frame pointer ($m_0$, $n_0$) and window width ($m_w$, $n_w$) or recalculates such a set of convolution coefficients each time the window position or window width is changed. However, this embodiment, because carrying out a filtering process after performing a two-dimensional Fourier transform, can cope with by merely changing only the size of two-dimensional filter window.

Now explanation is made on a third embodiment based on the invention.

This embodiment is configured to make a predetermined selection process on a data group existing within a pass band of two-dimensional filter window thereby further narrowing the data-capturing pass band. Incidentally, the receiver of this embodiment is similar in configuration to that of the first embodiment. The difference lies only in that the following processing is added upon the filtering process in the filter circuit 23. Furthermore, this embodiment may be used together in the second embodiment.

The two-dimensional filter circuit 23 of this embodiment is assumably set with a pass band A in the two-dimensional filter window, as shown in the foregoing FIG. 9 for example.

Accordingly, at the outside of the pass band of the two-dimensional filter window, the deduced transfer characteristic $\{g_{m,n}\}$ on the space (m, n) is defined as $$g_{m,n} = 0$$

in order to remove aliasing components similarly to the case of the first embodiment.

Meanwhile, concerning each of the carrier amplitude data groups included in the pass band of the two-dimensional filter window, the power $P_{m,n}$ is calculated as $$P_{m,n} = |h_{m,n}|^2.$$

Then, the power $P_{m,n}$ is compared with a predetermined power threshold Pth, to handle the relevant point as within the pass band only in the case of $$P_{m,n} > Pth$$

and define the deduced transfer characteristic as $$g_{m,n} = h_{m,n}.$$

Contrary to this, in the case that the power $P_{m,n}$ is smaller than the power threshold Pth, i.e. in the case of $$P_{m,n} < Pth$$

the relevant point is handles as in the outside of the pass band, thus defining an deduced transfer characteristic $\{g_{m,n}\}$ as $$g_{m,n} = 0.$$

Figure 15:
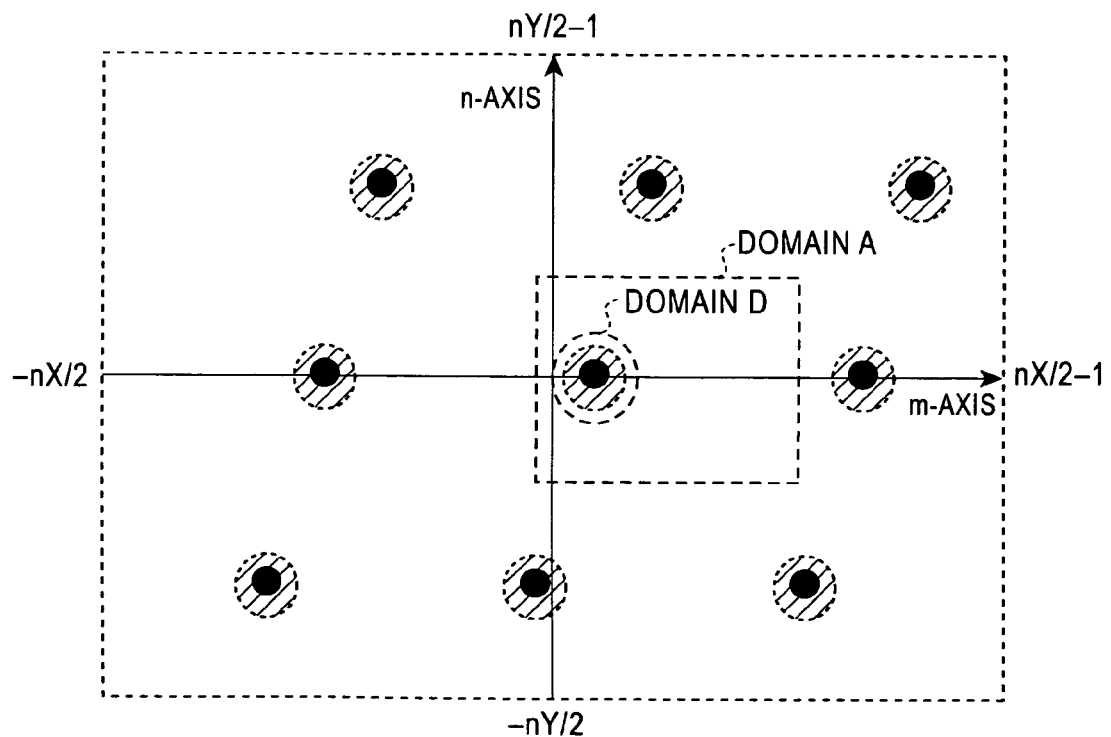
FIG. 15 is an explanatory figure showing a setting example of a two-dimensional filter window according to a third embodiment in reception environment 2.

By adding the above process to the filtering process in the filter circuit 23, the actual pass band of the two-dimensional filter window is degenerated to the range of a domain D shown in FIG. 15 in the case of an ideal reception environment shown in FIG. 9 for example. This makes it possible to remove, out of the pass band, the noise component existing within the range of the pass band A previously set to the two-dimensional filter window, thus enabling to improve the accuracy of transfer-characteristic estimating operation.

Figure 16:
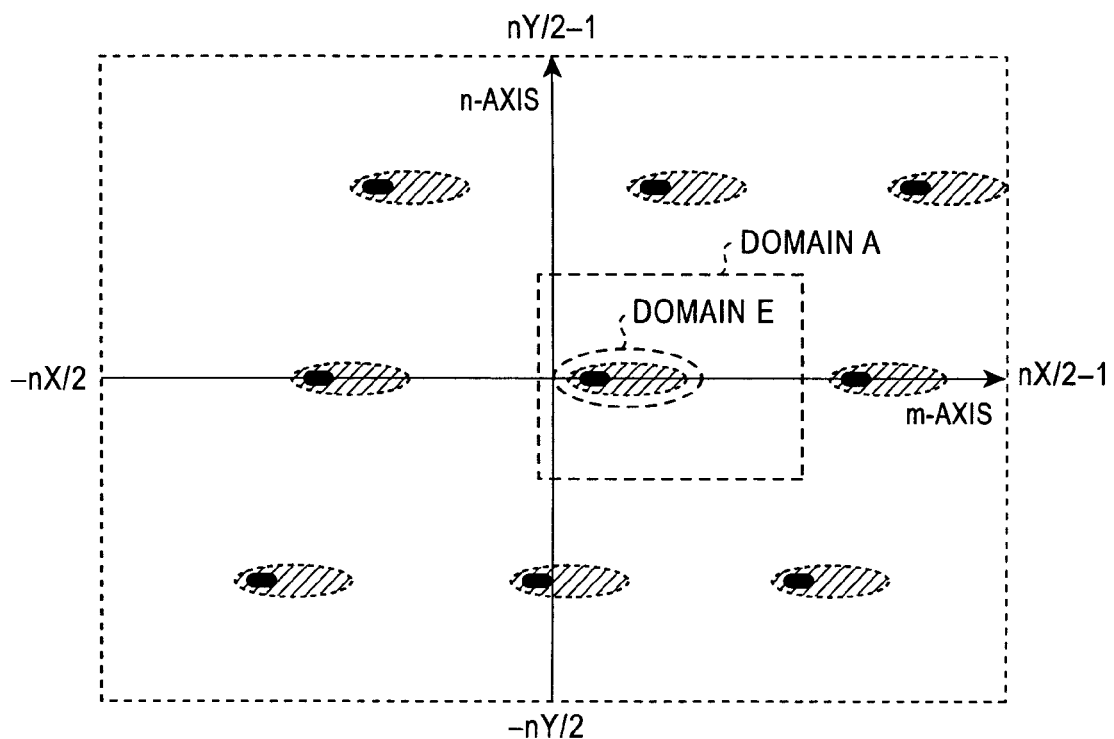
FIG. 16 is an explanatory figure showing a setting example of a two-dimensional filter window according to the third embodiment in reception environment 3.

Similarly, in FIG. 16 is shown a manner of pass band degeneration of the two-dimensional filter window in the case this embodiment is applied in the reception environment of FIG. 10. Incidentally, in FIGS. 15 and 16, the data within the range of the domain D and E naturally falls under the case of $$P_{m,n} > Pth.$$

Incidentally, although the above embodiment used the power value $P_{m,n}$ as a determination value for degenerating the pass band, the present embodiment is not limited to that case. For example, the determination value may use a complex absolute value $|h_{m,n}|$, an absolute-value sum of a complex real and imaginary parts $\{|Real\ (h_{m,n})| + |Imag\ (h_{m,n})|\}$, or the like.

Furthermore, in carrying out a weighting process during two-dimensional filtering by this embodiment, the above process may be implemented by dividing the pass band of two-dimensional filter window into a plurality of segments, for example. Namely, power is calculated on the data included in each of the segments and a mean power is calculated on each segment so that the mean power is compared with a predetermined threshold to thereby set the relevant segment as a pass band or as an outside of the pass band. This can suppress the influence of a local power variation as caused in the two-dimensional filter window. Meanwhile, because the determination process with a threshold is on a small-segment basis, it is possible to reduce the number of operations required in the determination process with a threshold and hence to simplify the process.

Incidentally, although the SP-carrier transfer characteristic $\{H_{p,q}: (p, q) \in Z_{2D}\}$, in nature, limitlessly spread in both directions of frequency (p-axis direction) and time (q-axis direction) with in a space (p, q), it is an extract of only a $Z_{2D}$ domain as a part thereof, as shown in FIG. 7 for example. Accordingly, in the $\{h_{m,n}\}$ obtained by making a two-dimensional Fourier transform on the domain $Z_{2D}$, an image component actually not to exist is included by the influence of a domain end. In particular, in the case of determining a substantial pass band of the two-dimensional filter window depending upon a spectrum distribution of power $P_{m,n}$ of $h_{m,n}$ as in this embodiment, there is a fear that the optimal two-dimensional filter window is not to be obtained under the influence of such image components.

Figure 17:
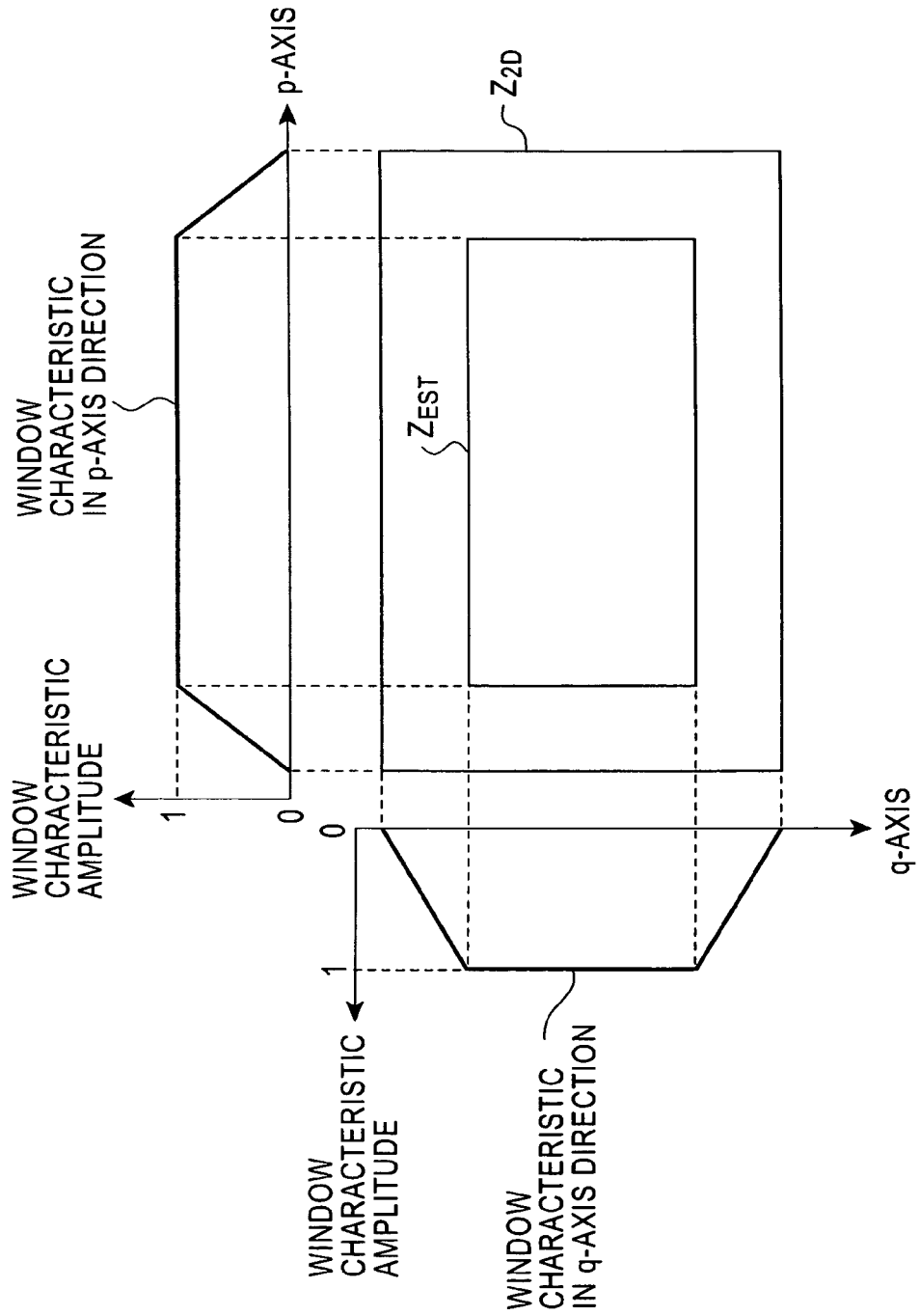
FIG. 17 is an explanatory figure showing an example of window function to be multiplied on the two-dimensional data domain.

In order to solve the problem, $\{h_{m,n}\}$ may be determined by making a two-dimensional Fourier transform after previously multiplying, on $\{H_{p,q}\}$, a window coefficient $\{W_{p,q}\}$ of a 2D-FFT domain. Incidentally, the multiplication with the window coefficient in this case may be naturally made on an SP-carrier location. Meanwhile, it is desired to provide a window form that the deduction domain $Z_{EST}$ in FIG. 6 is given as a pass band (window coefficient being 1) to thereby gradually lower the window coefficient from 1 toward 0 at the outer periphery thereof, e.g. a form as shown in FIG. 17.

As explained in the above, the filter circuit 23 of the receiver of this embodiment is characterized to selectively acquire only the data having a power equal to or greater than a reference value out of a data group included in the two-dimensional filter window.

Therefore, the present embodiment can freely degenerate the pass band of the two-dimensional filter window depending upon a power level of the data existing within the filter extracting domain. This can exclude the noise component having a low power level and extract only a spectrum component of an SP signal having a high power level, thus making it possible to accurately calculate an deduced transfer characteristic.

Now explanation is made on a fourth embodiment according to the invention.

In the foregoing third embodiment, there is a case of difficulty in setting a power threshold Pth. For example, in case Pth is set comparative low, the power of many noise components existing in the two-dimensional filter window exceeds the threshold Pth thus offsetting the degeneration effect of the two-dimensional filter window. On the other hand, in case the Pth is set higher, the SP-signal component power requisite for estimating a transfer characteristic this time cannot clear the threshold and blocked by the two-dimensional filter, thus making it impossible to calculate a desired deduced transfer characteristic. Furthermore, in the case of a vehicle-mounted receiver, because the C/N value of a reception signal varies at all times, there is a difficulty in steadily defining an optimal threshold.

The present embodiment, made in order to solve such a problem, is characterized to calculate a mean noise power over a domain no on-transmission-line transfer components would not exist on the space (m, n) and to determine a window component $W_{m,n}$ of two-dimensional filter window depending upon such a calculated value. Incidentally, the receiver of this embodiment is similar in configuration to the first embodiment except for a difference in the operation process of a window coefficient $W_{m,n}$ by the two-dimensional filter circuit 23.

There is shown in the below an operation example for determining a window coefficient $W_{m,n}$ in this embodiment.

Figure 18:
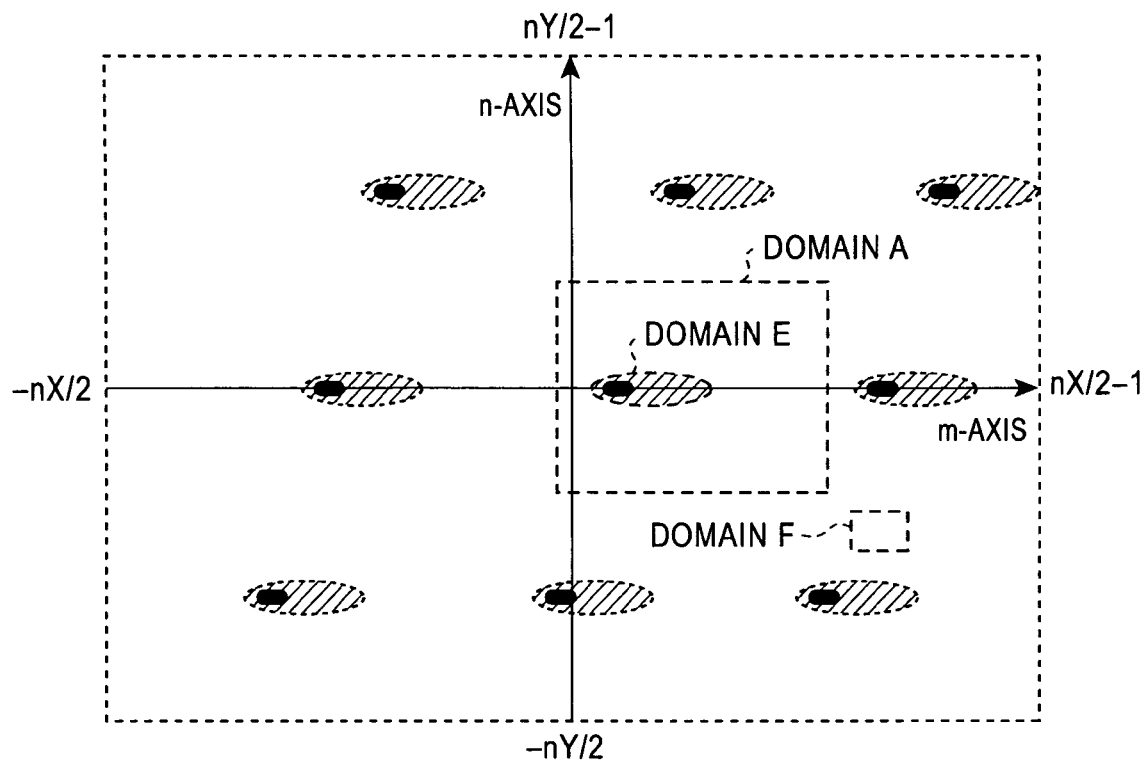
FIG. 18 is an explanatory figure showing a setting example of a two-dimensional filter window according to a fourth embodiment.

At first, as shown in FIG. 18, a noise observing domain F is provided at a predetermined position of the space (m, n) to thereby calculate a mean noise power NP of within the relevant domain.

Then, concerning the other domain than the two-dimensional filter window domain A previously set, a window coefficient $W_{m,n}$ is set as $$W_{m,n}=0$$

in order to remove aliasing components, similarly to the foregoing embodiment.

On the other hand, in the extraction domain of the two-dimensional filter window domain A, its power $P_{m,n}$ is calculated as $$P_{m,n}=|h_{m,n}|^2$$

on each of data included in the data group similarly to the case of the third embodiment.

By comparing such a calculated value with the foregoing mean noise power NP, in case $$P_{m,n} \leq NP,$$

the window coefficient $W_{m,n}$ is set as $$W_{m,n}=0.$$

Meanwhile, in case $$P_{m,n} \leq NP,$$

the window coefficient $W_{m,n}$ is set as $$W_{m,n}=(P_{m,n}-NP)/P_{m,n}.$$

Namely, in the present embodiment, the mean noise power NP measured at the noise observing domain F is first utilized as a threshold for the third embodiment, and further a value of window coefficient $W_{m,n}$ is determined by a least square criterion. Namely, the window coefficient $W_{m,n}$ is set of a value in a manner maximizing the power ratio of a transfer characteristic component of the SP signal as an output of the filter circuit 23 and a noise component. This makes it possible to narrow the pass band of the two-dimensional filter window domain A down to a further optimal domain E, as shown in FIG. 18.

Incidentally, in this embodiment, the extracting domain A of two-dimensional filter window may be further divided into smaller segments so that the above process can be carried out on each segment, similarly to the case of the third embodiment.

Meanwhile, after calculating the power $P_{m,n}$ of each data of the data group within the extracting domain, a value of $$Q_{m,n}=(P_{m,n}-NP)/P_{m,n}$$

may be once determined by use of that and the mean noise power NP, so that determination with a threshold is made on such $Q_{m,n}$ thereby setting 1 or 0 of window coefficient $W_{m,n}$.

As explained in the above, the receiver of this embodiment is characterized in that the filtering circuit 23 takes, as a reference value, a noise power measurement value of the other domain than the two-dimensional filter window and selectively acquires only the data having a power equal to or greater than the reference value, wherein the window function on the filter extracting domain is made to a reference in accordance with the noise power measurement value.

Accordingly, it is possible to properly determine and remove the noise components included within the two-dimensional filter window and to correctly fetch only the effective components of SP-signal transfer characteristic. Thus, accurate deduction of transfer characteristic is possible to carry out.

Now explanation is made on a fifth embodiment according to the invention. This embodiment is characterized in that carrier-based reliability information is generated by use of the mean noise power NP calculated in the fourth embodiment so that the Viterbi decoder provided in the data decode section carries out a decode processing of reception data depending upon such reliability information.

Figure 19:
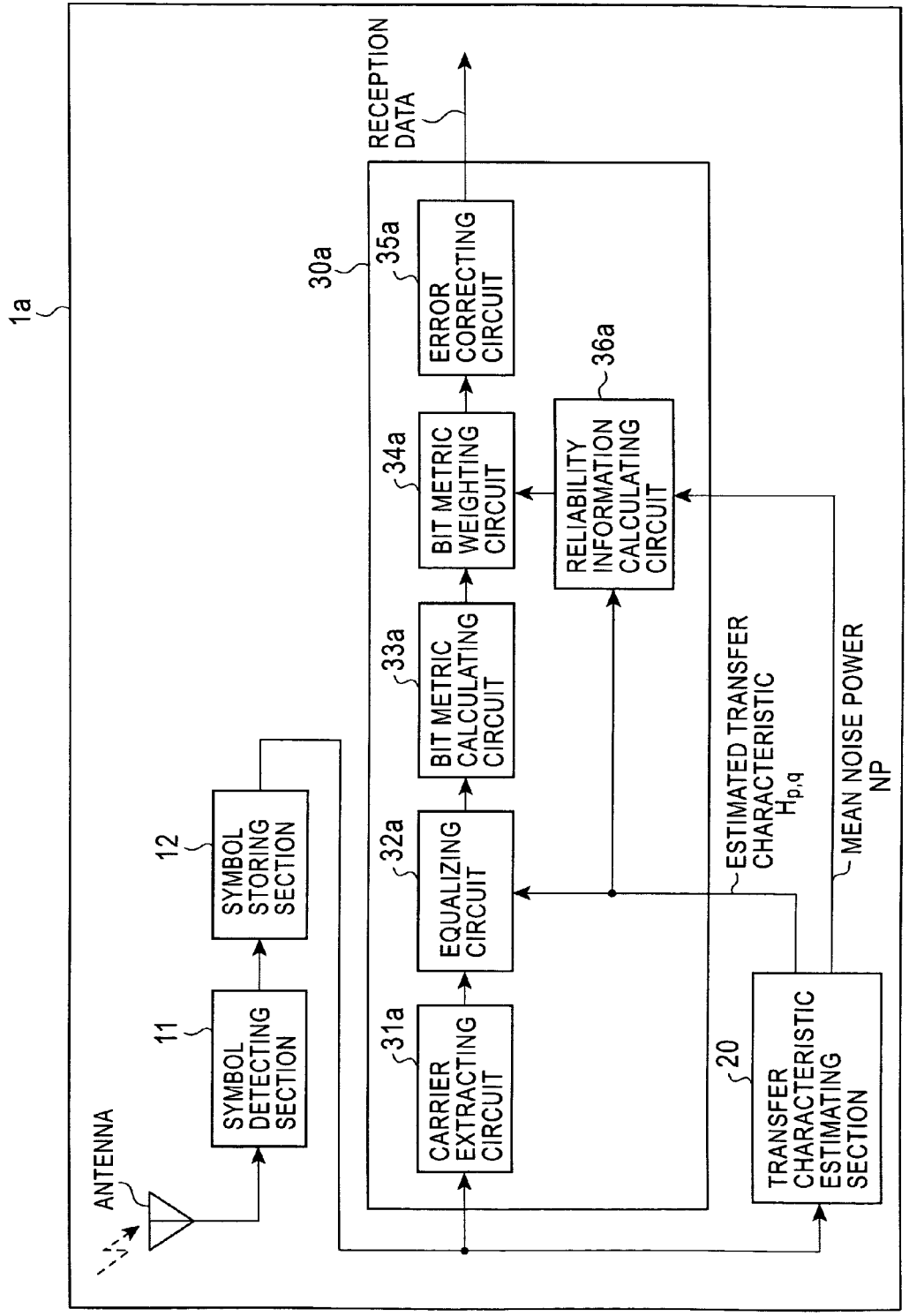
FIG. 19 is a block diagram showing a configuration of a receiver according to a fifth embodiment.

In FIG. 19 is shown a configuration of a receiver 1a and data decode section 30a according to the present embodiment. Incidentally, in the figure, the configuration of a signal detecting section 10 and transfer-characteristic estimating section 20 is assumably similar to the fourth embodiment.

In FIG. 19, a carrier extracting circuit 31a has a function similar to the counterpart circuit included in the foregoing data decode section 30, to extract a carrier amplitude $\{S_{p,q}: (p, q) \in Z_{EST}\}$ of within the deduction domain $Z_{EST}$ shown in the foregoing FIG. 6 from among the carrier amplitude data group stored in a symbol storing circuit 15 of the signal detecting section 10 and supplies it to the next-staged equalizer circuit 32a.

The equalizer circuit 32a divides the carrier amplitude by an deduced transfer characteristic supplied from the transfer-characteristic estimating section 20 to thereby equalize the amplitude and supplies a equalized carrier amplitude to the next-staged bit-metric calculating circuit 33a.

The bit-metric calculating circuit 33a is a circuit for calculating a bit metric for use in Viterbi decode. Generally, bit-metric calculating techniques are roughly divided as those using hard decisions and those using soft decisions. Here, hard decision is a method to decide only a single-valued demodulation output on each reception symbol. On the other hand, soft decision is a method to output a deduction value of reception symbol value and its reliability both as demodulation values. Usually, this is to be realized by quantizing a reception signal into levels more than its symbol value. Incidentally, there are further various schemes in the decision method using soft decision. In any case, it is a general practice to calculate a bit metric in an amount of bits per the carrier from one carrier amplitude according to a predetermined constellation mapping. Namely, from one carrier of after equalization, two bit metrics as bits in an amount of one symbol is calculated for QPSK while four bit metrics as bits in an amount of one symbol is calculated for 16 QAM.

Meanwhile, a reliability-information calculating circuit 36a is a circuit for calculating carrier-based reliability information depending upon an deduced transfer characteristic $H_{p,q}$ and noise mean power NP supplied from the transfer-characteristic estimating section 20. Provided that the reliability information of each carrier is $B_{p,q}$, reliability information $B_{p,q}$ may be calculated, for example, as $$B_{p,q}=|H_{p,q}|^2/NP.$$

In this connection, the above equation is on the case using carrier-based deduced CN value as reliability information.

A bit-metric weighting circuit 34a is a circuit which multiplies the bit metric supplied from the bit-metric calculating circuit 33a by the reliability information supplied from the reliability-information calculating circuit 36a thereby making a predetermined weighing.

An error correcting circuit 35a is a circuit which makes a Viterbi decode on the reception signal depending upon a bit metric done by a predetermined weighting supplied from the bit-metric weighting circuit 34a and carries out various error corrections, such as predetermined defined hierarchical division, deinterleave process, derandamization process and RS decode process, and a decode process.

As explained above, in the receiver according to this embodiment, the data decode section 30 thereof includes the reliability-information calculating circuit 36a for calculating reliability information on each of reception carriers depending upon an deduced transfer characteristic and noise power measurement value supplied from the transfer-characteristic estimating section 20, and the bit-metric weighting circuit 34a for making a weighting on a restoration parameter of upon reception data restoration depending upon the reliability information.

Accordingly, the receiver according to the present embodiment can make a Viterbi decoding by use of a properly weighted bit metric depending upon a carrier-based amplitude and an on-transmission-line noise power, thus enabling to improve the error-rate correction characteristic on the reception signal.

Now explanation is made on a sixth embodiment according to the invention.

In the meanwhile, in the embodiments explained above, explanation was made on the assumption that there are adjacent segments on both sides of the central segment in the OFDM reception band, for example, as shown in FIG. 1 and wherein each segment is a synchronization segment superimposed with an SP signal over a carrier group within the segment. However, in the actual terrestrial digital broadcast, there are cases that there exist no segments adjacent to a segment as a subject of reception or that an adjacent segment if exists is a differential segment not superimposed with an SP signal over a carrier group within the segment.

In such a case, because SP signals do not exist in the domain adjacent right or left to the central segment within the 2D-FFT domain, it is impossible to calculate an SP-signal transfer characteristic $\{H_{p,q}\}$ of within the adjacent domain. However, in case setting is made as $H_{p,q}=0$ in the adjacent domain from such reasons, error arises in a calculation result of deduced transfer characteristic by the influence of such adjacent domains.

The present embodiment has been made in order to relieve the influence of such adjacent domains. As for the left and right domains to the central segment, the operation process in the SP transfer-characteristic calculation circuit 21 is improved in order to calculate an SP-signal transfer characteristic by an extrapolation process. Accordingly, the receiver based on this embodiment assumably has a configuration similar to the first embodiment.

Now explanation is made on an operation example in the SP transfer-characteristic calculation circuit 21 of the transfer-characteristic estimating section 20 according to the present embodiment.

At first, concerning a symbol at a certain index q, transfer characteristics $\{H_{p,q}\}$ at the SP signal points are calculated for the domain of the segment where SP signals are superimposed (central segment), similarly to the conventional.

Then, of the indexes p at which transfer characteristics have been calculated, the minimum value is taken as B and the maximum value as T, to determine the following rotation factors $U_B$ and $U_T$.

$$U_B = H_{B,q}/(H_{B,q})^*$$

$$U_T = H_{T,q}/(H_{T,q})^*$$

Incidentally, it is assumed that, in the above equations, (X) * means a conjugate complex to a complex (X).

Thereafter, for the left domain to the central segment, the SP-signal transfer characteristic of within the relevant domain is calculated on the basis of the following equation.

$$H_{B-12n,q} = U_B \Delta (H_{B+12n,q})^* \text{(where } n=1, 2, \ldots )$$

This manner is shown in FIGS. 20A and 20B. FIG. 20A represents a left end part of the central segment and a left side adjoining domain to the central segment, wherein the area where no carrier signals exist on the p-axis corresponds to the left domain. Meanwhile, FIG. 20B shows a procedure to deduce the SP-signal transfer characteristics assumed within the left domain by the extrapolation shown in the above equation. In this case, the virtual SP-signal transfer characteristics within the left domain are deduced from the SP-signal transfer characteristic lying in a mirror-image relationship on the p-axis about, as a symmetric point, a position of the SP-signal transfer characteristic $H_{B,q}$ at the extreme left end of the central segment.

Meanwhile, for the right domain of the central segment, the SP-signal transfer characteristics within the relevant domain are similarly calculated on the basis of the below equation.

$$H_{T+12n,q} = U_T \times (H_{T-12n,q})^* \text{(where } n=1, 2, \ldots )$$

In FIG. 20, there is also shown together an amplitude characteristic (20C) and phase characteristic (20D) of SP-signal transfer characteristic to be deduced by the above procedure. However, as apparent from the same figure, the amplitude characteristic and phase characteristic of SP-signal transfer characteristic in the adjacent domain is a smooth amplitude/phase characteristic continuous with the central segment. Namely, the present embodiment can relieve the influence upon deduced transfer characteristic as caused by putting 0 the transfer characteristic in the adjacent domain.

Incidentally, under the ISDB-T standard, in the case that there is no adjacent segment on the right of the segment to be received for example, there is a case that a continual pilot signal (hereinafter, referred to as a "CP signal") is added to the extreme right end of the relevant segment. Meanwhile, in the case that the adjacent segment on the right side is a differential segment not including SP signals, a CP signal is given at a left end of the same segment similarly to that. In such a case, the SP-signal transfer characteristic within the adjacent domain may be calculated about the CP signal as a symmetric point, as shown in FIG. 21. FIG. 21A represents a right end of and right domain to the central segment, wherein the area no carrier signals exist on the p-axis means the right domain. Meanwhile, FIG. 21B shows a procedure to deduce SP-signal transfer characteristics assumed within the right domain by the extrapolation.

Meanwhile, the extrapolation for determining an SP-signal transfer characteristic of within the adjacent domain may employ a scheme shown in FIG. 22.

At first, concerning a symbol at a certain index q, for the central segment domain where SP signals are superimposed, calculated are transfer characteristics $\{H_{p,q}\}$ at the points of SP signals similarly to the conventional.

Then, of the indexes p at which transfer characteristics have been calculated, the minimum value is taken as B and the maximum value as T, to determine the following rotation factors $U_B$ and $U_T$.

$$U_B = H_{B,q}/(H_{B,q})^*$$

$$U_T = H_{T,q}/(H_{T,q})^*$$

Incidentally, in the above equations, it is assumed that (X) * means a conjugate complex to a complex (X).

Thereafter, for the left domain to the central segment, the following is provided:

$$H_{B-12n,q} = H_{B,q}$$

$$H_{B-12(n+1),q} = U_B \times (H_{B+12n,q})^* \text{(where } n=1, 2, \ldots ).$$

Meanwhile, for the right domain to the central segment, the following is provided:

$$H_{T+12n,q} = H_{T,q}$$

$$H_{T+12(n+1),q} = U_T \times (H_{T-12n,q})^* \text{ (where } n=1, 2, \ldots\text{)}.$$

By these equations, the SP-signal transfer characteristics within the respective domain are calculated.

Figure 22A:
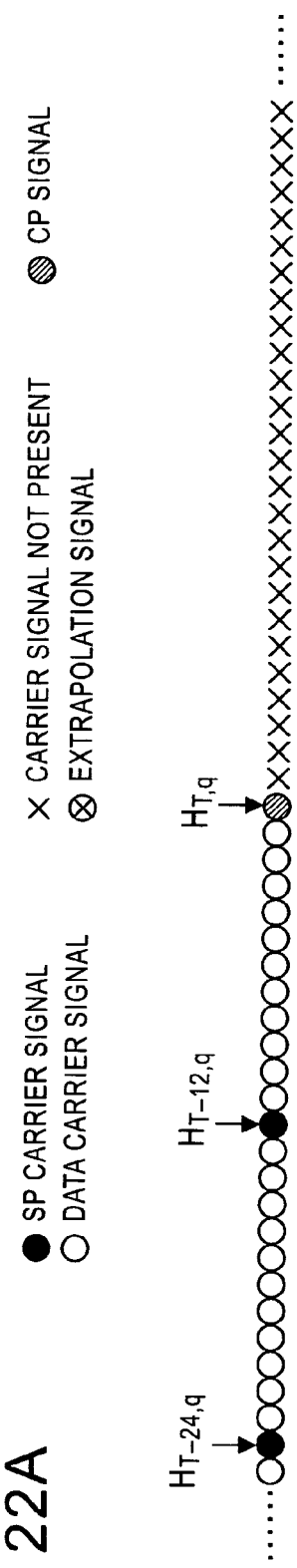
FIGS. 22A and 22B are explanatory figures showing a third deduction procedure of an SP-signal transfer characteristic according to the sixth embodiment.
Figure 22B:
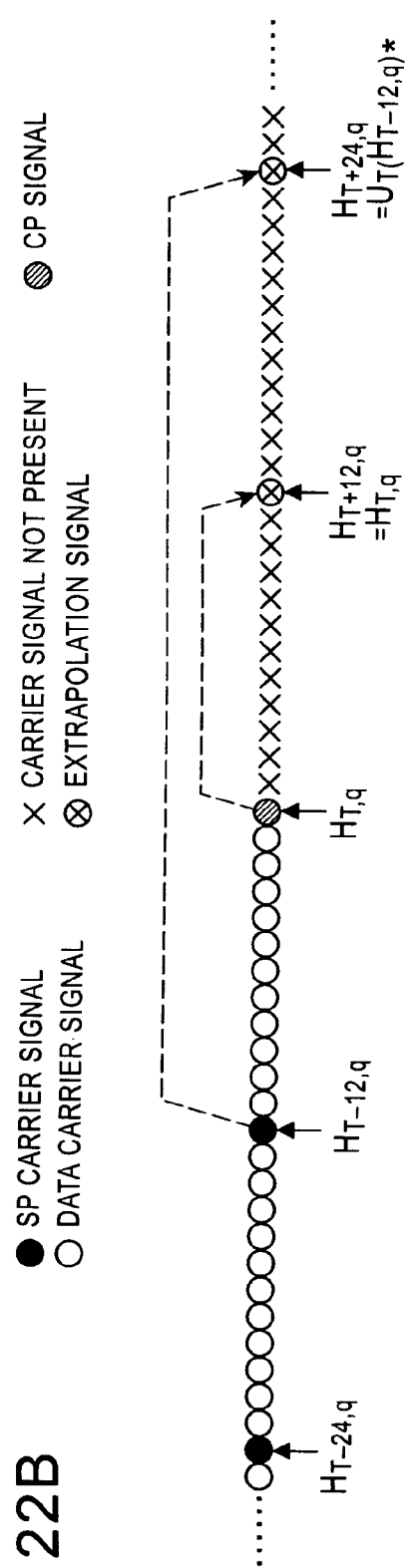

FIG. 22A represents a right end of and right domain to the central segment, wherein the area no carrier signals exist on the p-axis means the right domain. Meanwhile, FIG. 22B shows a procedure to deduce SP-signal transfer characteristics assumed within the right domain by the extrapolation shown in the above equation. In this case, the virtual SP-signal transfer characteristics within the left domain are deduced such that the SP-signal transfer characteristics following the CP-signal transfer characteristic $H_{T,q}$ at the extreme right end of the central segment assume in a mirror-image relationship on the p-axis.

As explained above, the calculating circuit 21 of the receiver according to this embodiment is characterized to calculate the assumed pilot carrier transfer characteristics to be deduced within an extension domain obtained by extending the two-dimensional data domain in the direction of carrier frequency. This can relieve the influence of the both-end domains of the segment during transfer characteristic deduction and improve the accuracy of deduced transfer characteristic.

This application is based on Japanese Patent application No. 2004-037968 which is herein incorporated by reference.

What is claimed is:

1. A signal receiving apparatus comprising:
   a signal detecting section which receives an OFDM signal including a pilot carrier having a particular known complex amplitude at a predetermined carrier location, and allots each of a plurality of reception complex amplitudes obtained by detecting carrier signals included in a plurality of successive ones of OFDM symbols in a two-dimensional data domain corresponding to carrier frequency and symbol time;
   a transfer characteristic estimating section which estimates a reception signal transfer characteristic relative to each of the carrier signals based on a reception complex amplitude corresponding to the pilot carrier among the plurality of reception complex amplitudes allotted in the two-dimensional data domain; and
   a data decode section which decodes transmission data based on the reception complex amplitude and the reception signal transfer characteristics;
   wherein the transfer characteristic estimating section includes;
   a calculator which calculates pilot carrier transfer characteristics based on the reception complex amplitude corresponding to the pilot carrier among the plurality of reception complex amplitudes allotted in the two-dimensional data domain;
   a transformer which generates two-dimensional Fourier transformed data on a two-dimensional space corresponding to on-transmission-line delay time and on-transmission-line variation frequency by performing a two-dimensional Fourier transform on the pilot carrier transfer characteristics;
   a filter which selectively extracts a data group within a particular domain defined by a filter extracting domain from the two-dimensional Fourier transformed data;
   a supplier which supplies the filter with a setting parameter to regulate a setting position of the filter extracting domain depending upon an input instruction, the filter defining the particular domain depending upon the setting parameter; and
   a generator which generates two-dimensional inverse transformed data on the two-dimensional space corresponding to the carrier frequency and the symbol time by performing a two-dimensional inverse Fourier transform on the selectively extracted data group, and generates the reception signal transfer characteristic based on the generated two-dimensional inverse transformed data,
   wherein the setting parameter is a reference pointer representative of a domain reference point of the filter extracting domain and a domain width of the filter extracting domain.

2. A signal receiving apparatus comprising:
   a signal detecting section which receives an OFDM signal including a pilot carrier having a particular known complex amplitude at a predetermined carrier location, and allots each of a plurality of reception complex amplitudes obtained by detecting carrier signals included in a plurality of successive ones of OFDM symbols in a two-dimensional data domain corresponding to carrier frequency and symbol time;
   a transfer characteristic estimating section which estimates a reception signal transfer characteristic relative to each of the carrier signals based on a reception complex amplitude corresponding to the pilot carriers among the plurality of reception complex amplitudes allotted in the two-dimensional data domain; and
   a data decode section which decodes the transmission data based on the reception complex amplitude and the reception signal transfer characteristics;
   wherein the transfer characteristic estimating section includes:
   a calculator which calculates pilot carrier transfer characteristics based on the reception complex amplitude corresponding to the pilot carrier among the plurality of reception complex amplitudes allotted in the two-dimensional data domain;
   a transformer which generates two-dimensional Fourier transformed data on a two-dimensional space corresponding to on-transmission-line delay time and on-transmission-line variation frequency by performing a two-dimensional Fourier transform on the pilot carrier transfer characteristics;
   a filter which selectively extracts a data group within a particular domain defined by a filter extracting domain from the two-dimensional Fourier transformed data; and
   a generator which generates two-dimensional inverse transformed data on the two-dimensional space corresponding to the carrier frequency and the symbol time by performing a two-dimensional inverse Fourier transform on the selectively extracted data group, and generates the reception signal transfer characteristic based on the generated two-dimensional inverse transformed data,
   wherein the filter selectively extracts only data having a power equal to or greater than a reference value out of the data group included within the filter extracting domain, and takes a noise power measurement value in a domain other than the filter extracting domain on the two-dimensional Fourier transformed data space as the reference value and a window function of the filter extracting domain is adjusted in accordance with the noise power measurement value.

3. A signal receiving apparatus comprising:

a signal detecting section which receives an OFDM signal including a pilot carrier having a particular known complex amplitude at a predetermined carrier location, and allots each of a plurality of reception complex amplitude obtained by detecting carrier signals included in a plurality of successive ones of OFDM symbols in a two-dimensional data domain corresponding to carrier frequency and symbol time;

a transfer characteristic estimating section which estimates a reception signal transfer characteristic relative to each of the carrier signals based on a reception complex amplitude corresponding to the pilot carrier among the plurality of reception complex amplitudes allotted in the two-dimensional data domain; and a data decode section which decodes the transmission data based on the reception complex amplitude and the reception signal transfer characteristics;

wherein the transfer characteristic estimating section includes:

a calculator which calculates pilot carrier transfer characteristics based on the reception complex amplitude corresponding to the pilot carrier among the reception complex amplitudes allotted in the two-dimensional data domain;

a transformer which generates two-dimensional Fourier transformed data on a two-dimensional space corresponding to on-transmission-line delay time and on-transmission-line variation frequency by performing a two-dimensional Fourier transform on the pilot carrier transfer characteristics;

a filter which selectively extracts a data group within a particular domain defined by a filter extracting domain from the two-dimensional Fourier transformed data; and a generator which generates two-dimensional inverse transformed data on the two-dimensional space corresponding to the carrier frequency and the symbol time by performing a two-dimensional inverse Fourier transform on the selectively extracted data group, and generates the reception signal transfer characteristic based on the generated two-dimensional inverse transformed data, wherein the filter divides the filter extracting domain into a plurality of segments and calculates a mean power for each of the segments, to thereby selectively extract only data included in a segment where the mean power has a power equal to or greater than a reference value, and takes a noise power measurement value in a domain other than the filter extracting domain on the two-dimensional Fourier transformed data space as the reference value and a window function of the filter extracting domain is adjusted in accordance with the noise power measurement value.

4. A signal receiving apparatus according to claim 2, wherein the data decode section includes a reliability information calculator for calculating reliability information about each reception signal depending upon the reception transfer characteristic and noise power measurement value supplied from the transfer characteristic estimating section, and a weighter for giving a weighting to a decode parameter during decoding the reception signal depending upon the reliability information.

5. A signal receiving apparatus according to claim 4, wherein the reliability information calculator uses as the reliability information a carrier/noise power ratio calculated depending upon the reception signal transfer characteristic and noise power measurement value.

6. A signal receiving apparatus according to claim 4, wherein the decode parameter is bit metric information in a viterbi decoder.

7. A signal receiving apparatus according to claim 5, wherein the decode parameter is bit metric information in a viterbi decoder.

8. A signal receiving apparatus according to any one of claims 1 and 2-7, wherein the transformer multiplies the two-dimensional data domain by a predetermined window function, during carrying out the two-dimensional Fourier transform.

9. A signal receiving apparatus according to claim 8, wherein the window function has a multiplication coefficient decreasing at a constant rate from an estimating data domain to the two-dimensional data domain.

10. A signal receiving apparatus according to any one of claims 1 and 2-7, wherein the calculator calculates a transfer characteristic of a virtual pilot carrier allotted within an extended domain obtained by extending the two-dimensional data domain in a direction of the carrier frequency.

11. A signal receiving apparatus according to claim 10, wherein the calculator generates a rotation parameter depending upon a transfer characteristic of an extreme end pilot carrier of carrier frequency in the two-dimensional data domain, takes the extreme end pilot carrier as a symmetric point on the carrier frequency, and multiplies the rotation parameter on the transfer characteristics of the extreme end pilot carrier within the two-dimensional data domain lying in a mirror-image relationship with an extended domain thereby calculating a transfer characteristic of a virtual pilot carrier.

12. A signal receiving apparatus according to claim 10, wherein the calculator generates a rotation parameter depending upon a transfer characteristic of an extreme end pilot carrier of carrier frequency in the two-dimensional data domain, and multiplies the rotation parameter on the transfer function of the pilot carrier within the two-dimensional data domain lying in a mirror-image relationship with the extended domain on the carrier frequency thereby calculating a transfer characteristic of a virtual pilot carrier.

13. A signal receiving apparatus according to claim 11, wherein the rotation parameter is a ratio of the transfer characteristic of the extreme end pilot carrier and a conjugate complex transfer characteristic of the extreme end pilot carrier.

14. A signal receiving apparatus according to claim 12, wherein the rotation parameter is a ratio of the transfer characteristic of the extreme end pilot carrier and a conjugate complex transfer characteristic of the extreme end pilot carrier.

15. A signal receiving method comprising:

a step of receiving an OFDM signal including a pilot carrier having a particular known complex amplitude at a predetermined carrier location, and allotting each of a plurality of reception complex amplitudes obtained by detecting carrier signals included in a plurality of successive ones of ODFM symbols in a two-dimensional data domain corresponding to carrier frequency and symbol time;

a step of estimating a reception signal transfer characteristic relative to each of the carrier signals based on a reception complex amplitude corresponding to the pilot carrier among the plurality of reception complex amplitudes allotted in the two-dimensional data domain; and a step of decoding the transmission data based on the plurality of reception complex amplitudes and the reception signal transfer characteristics;

wherein the reception signal transfer characteristic estimating step includes:

calculating pilot carrier transfer characteristics based on the reception complex amplitude corresponding to the pilot carrier among the plurality of reception complex amplitudes allotted in the two-dimensional data domain;

making a two-dimensional Fourier transform on the pilot carrier transfer characteristics and generating two-dimensional Fourier transformed data on a two-dimensional space corresponding to on-transmission-line delay time and on-transmission-line variation frequency;

selectively extracting a data group of within a particular domain defined by a filter extracting domain from the two-dimensional Fourier transformed data; and making a two-dimensional inverse Fourier transform on the selectively extracted data group and generating two-dimensional inverse transformed data of on the two-dimensional space corresponding to the carrier frequency and the symbol time, and generating the reception signal transfer characteristic based on the generated two-dimensional inverse transformed data, wherein only data having a power equal to or greater than a reference value is selectively extracted out of the data group included within the filter extracting domain, and a noise power measurement value in a domain other than the filter extracting domain on the two-dimensional Fourier transformed data space is taken as the reference value and a window function of the filter extracting is adjusted in accordance with the noise power measurement value.

* * * * *